United States Patent
Michael

(10) Patent No.: US 12,227,260 B1
(45) Date of Patent: Feb. 18, 2025

(54) VEHICLE AND VEHICLE COMPONENTS

(71) Applicant: LiteCycle, Inc., Vancouver, WA (US)

(72) Inventor: Jeffrey Michael, Greenbrier, TN (US)

(73) Assignee: LiteCycle, Inc., Vancouver, WA (US)

( * ) Notice: Subject to any disclaimer, the term of this patent is extended or adjusted under 35 U.S.C. 154(b) by 353 days.

(21) Appl. No.: 17/841,099

(22) Filed: Jun. 15, 2022

Related U.S. Application Data

(60) Provisional application No. 63/210,780, filed on Jun. 15, 2021.

(51) Int. Cl.
| | | |
|---|---|---|
| *B62K 21/14* | (2006.01) | |
| *B62K 15/00* | (2006.01) | |
| *B62K 21/16* | (2006.01) | |

(52) U.S. Cl.
CPC ............. *B62K 21/14* (2013.01); *B62K 21/16* (2013.01); *B62K 2015/001* (2013.01)

(58) Field of Classification Search
CPC .......................... B62K 21/14; B62K 2015/001
See application file for complete search history.

(56) References Cited

U.S. PATENT DOCUMENTS

| | | |
|---|---|---|
| 2,320,489 A | 6/1943 | Turner et al. |
| 3,054,700 A | 3/1981 | Belden |
| 4,502,727 A | 3/1985 | Holcomb |
| 4,909,537 A | 3/1990 | Tratner |
| 5,282,517 A | 2/1994 | Prince |
| 5,498,013 A | 3/1996 | Hwang |
| 5,611,557 A | 3/1997 | Farris et al. |
| 5,629,524 A | 5/1997 | Stettner et al. |
| 6,112,840 A | 9/2000 | Forbes |

(Continued)

FOREIGN PATENT DOCUMENTS

| | | |
|---|---|---|
| JP | WO 2012-029115 | 3/2012 |
| KR | 10-2004-0045526 | 6/2004 |

(Continued)

OTHER PUBLICATIONS

Allowed claims of commonly-owned U.S. Pat. App. No. 17/3348,069, showing proposed amendments after allowance. U.S. Pat. App. No. 17/3348,069 corresponds to U.S. Pub. No. 2021/0309318.

*Primary Examiner* — Kevin Hurley
*Assistant Examiner* — Hosam Shabara
(74) *Attorney, Agent, or Firm* — Gardner, Linn, Burkhart & Ondersma LLP

(57) ABSTRACT

A position adjusting system for use in a vehicle includes a seat for supporting a rider, a rear wheel and a steerable front wheel, a steering arrangement including a handlebar for allowing the rider to control the steerable wheel, and a hub for interconnecting the components of the wheeled vehicle. The steerable wheel is steerable about at least two axes. The position adjusting system includes an adjustable seat support movably connected to the hub, an adjustable handlebar support movably connected to the hub, and a releasable position locking system configured to lock the position of the components of the vehicle relative to the hub. The hub includes a first portion and second portion, wherein the first and second portions are moveably connected to one another, such as by pivoting, sliding, orbiting, or a combination thereof. The hub permits adjustment of the angle between the steering axes.

20 Claims, 27 Drawing Sheets

(56) References Cited

U.S. PATENT DOCUMENTS

| | | |
|---|---|---|
| 6,119,449 A | 9/2000 | Kohler |
| 6,131,934 A | 10/2000 | Sinclair |
| 6,203,042 B1 | 3/2001 | Wilcox |
| 6,206,397 B1 | 3/2001 | Klassen et al. |
| 6,276,234 B1 | 8/2001 | Harrington |
| 6,450,520 B1 | 9/2002 | Girard |
| 6,543,308 B2 | 4/2003 | Harrington |
| 7,104,158 B2 | 9/2006 | Harrington |
| 7,128,329 B2 | 10/2006 | Weagle |
| 7,316,288 B1 | 1/2008 | Bennett et al. |
| 7,450,101 B2 | 11/2008 | Arimoto |
| 7,806,217 B2 | 10/2010 | Hasegawa et al. |
| 8,074,381 B2 | 12/2011 | Harrington |
| 8,100,425 B2 | 1/2012 | Raynor |
| 8,136,829 B1 | 3/2012 | Kang et al. |
| 9,056,644 B2 | 6/2015 | Hudak |
| 9,669,894 B2 * | 6/2017 | Michael .................. B62K 17/00 |
| 10,150,529 B2 * | 12/2018 | Augustinoy ......... B62K 15/006 |
| 10,227,105 B2 | 3/2019 | Michael |
| 11,034,408 B2 | 6/2021 | Michael |
| 2003/0038448 A1 | 2/2003 | Efflandt, Sr. |
| 2003/0092534 A1 | 5/2003 | Forcillo |
| 2003/0146596 A1 | 8/2003 | Muser |
| 2004/0239071 A1 | 12/2004 | Chamberlain et al. |
| 2004/0239072 A1 | 12/2004 | Chou |
| 2004/0239158 A1 | 12/2004 | Clutton |
| 2005/0057018 A1 | 3/2005 | Saiki |
| 2005/0236804 A1 | 10/2005 | Alonzao |
| 2006/0061059 A1 | 3/2006 | Lesage et al. |
| 2006/0064223 A1 | 3/2006 | Voss |
| 2006/0071444 A1 | 4/2006 | Griffiths |
| 2006/0197306 A1 | 9/2006 | O'Connor |
| 2008/0073868 A1 | 3/2008 | Weagle |
| 2009/0102158 A1 | 4/2009 | Antonot |
| 2010/0109282 A1 | 5/2010 | Weagle |
| 2010/0264623 A1 | 10/2010 | Peterson |
| 2011/0037580 A1 | 2/2011 | Lin |
| 2011/0095507 A1 | 4/2011 | Plantet et al. |
| 2011/0272909 A1 | 11/2011 | Twers |
| 2012/0126506 A1 | 5/2012 | Zawistowski |
| 2012/0166044 A1 | 6/2012 | Battlogg |
| 2012/0326416 A1 | 12/2012 | Talavasek |
| 2013/0154308 A1 | 6/2013 | Sotoyama et al. |
| 2013/0249188 A1 | 9/2013 | Beale |
| 2014/0159338 A1 | 6/2014 | Thoma |
| 2014/0210180 A1 | 7/2014 | Hudak |
| 2014/0221158 A1 | 8/2014 | Mabey et al. |
| 2014/0274565 A1 | 9/2014 | Boyette et al. |
| 2015/0307152 A1 | 10/2015 | van Steenwyk |
| 2015/0353160 A1 | 12/2015 | Augustinoy et al. |
| 2016/0052591 A1 * | 2/2016 | Michael .................. B62K 25/26 280/5.507 |
| 2016/0153515 A1 | 6/2016 | Ebersbach et al. |
| 2018/0200566 A1 | 7/2018 | Weston et al. |
| 2019/0193807 A1 | 6/2019 | Michael |
| 2021/0309318 A1 | 10/2021 | Michael |
| 2022/0411013 A1 * | 12/2022 | Watanabe ............. B62K 19/34 |

FOREIGN PATENT DOCUMENTS

| | | |
|---|---|---|
| KR | 10-2008-0093666 | 10/2008 |
| KR | 10-2011-0002511 | 1/2011 |
| KR | 10-2011-0016766 | 2/2011 |

* cited by examiner

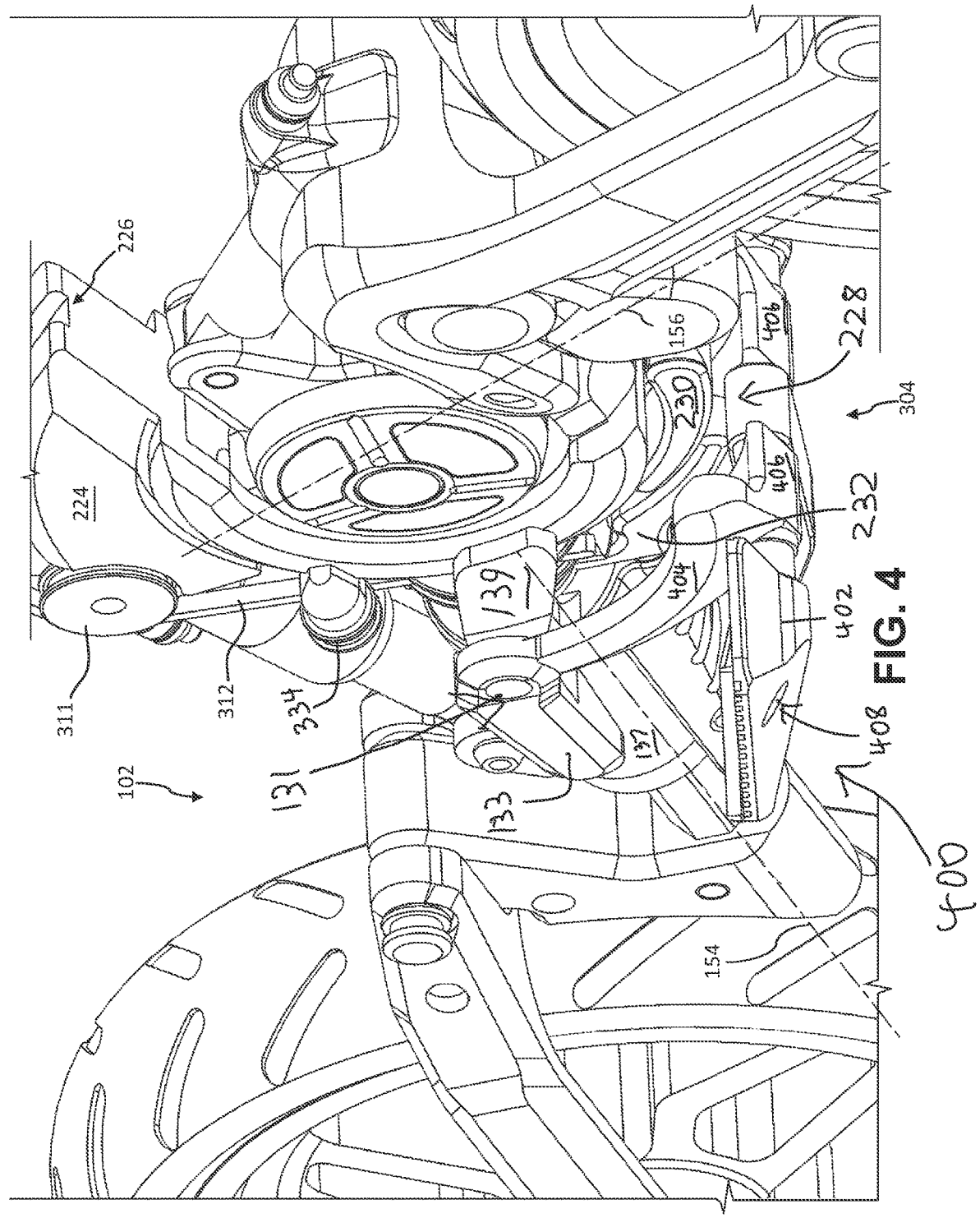

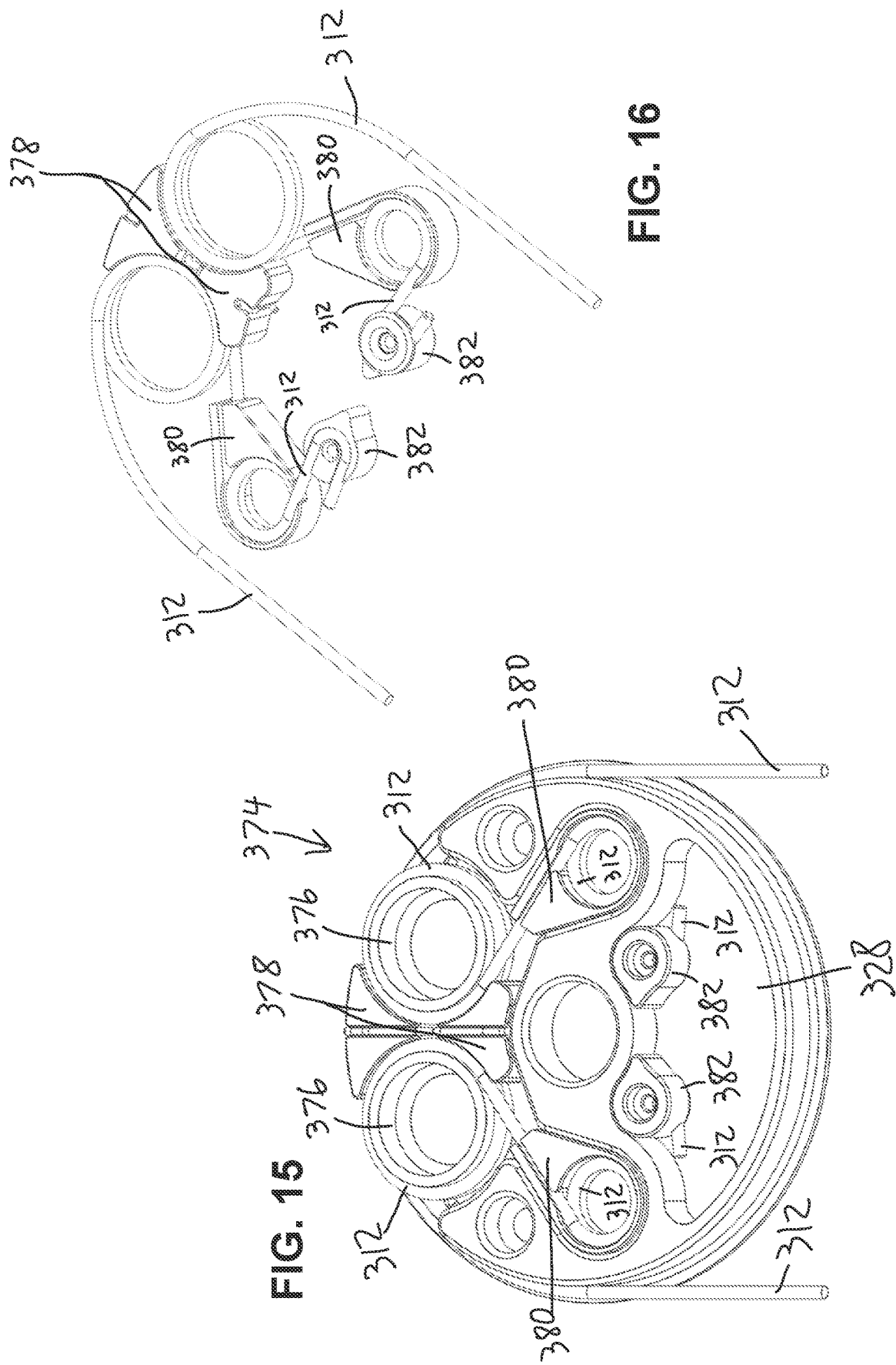

VEHICLE AND VEHICLE COMPONENTS

CROSS REFERENCE TO RELATED APPLICATIONS

The present invention claims the benefit of U.S. provisional patent application Ser. No. 63/210,780, filed Jun. 15, 2021, which is hereby incorporated herein by reference in its entirety.

FIELD OF THE INVENTION

The present invention relates to methods and systems for providing vehicles and vehicle components including suspension systems, steering systems, rotational drive systems, ergonomic position adjusting systems, and safety systems.

BACKGROUND OF THE INVENTION

Present day vehicles have grown to a high level of popularity and many are highly specialized for certain applications. These specialized applications impose extraordinary requirements on various vehicle systems and components. Despite these extraordinary requirements, many of the basic vehicle systems such as suspension systems, steering systems, driveline systems, ergonomic position adjusting systems, and safety systems have remained relatively unchanged for quite some time.

SUMMARY OF THE INVENTION

The present invention provides a vehicle that includes a main vehicle body, a suspended assembly that supports the main body of the vehicle, a suspension system for connecting the suspended assembly to the main vehicle body, a position adjusting system for the vehicle, a multi-axis steering system for a vehicle, a cable steering system for controlling a multi-axis steering system of the vehicle, and a rider foot support system for the vehicle. The position adjusting system includes an orbital hub which permits the front of the vehicle to rotate relative to the rear of the vehicle about a generally vertical axis that passes through the main body of the vehicle. The orbital hub also includes a rotatable arrangement in which one portion of the hub is rotatable relative to the other portion of the hub. The rotatable hub arrangement provides for adjustability of the wheelbase of the vehicle and also allows for adjustment of the rider position on the vehicle.

These and other objects, advantages, purposes and features of this invention will become apparent upon review of the following specification in conjunction with the drawings.

BRIEF DESCRIPTION OF THE DRAWINGS

FIG. 4 is an enlarged rear-left side perspective view of a portion of the hub of the motorcycle of FIG. 1.

FIG. 15 is a top perspective view of a steering input pulley of the cable and pulley assembly of FIG. 14;

FIG. 16 is a partially exploded view of the cable and routing elements of the steering input pulley of FIG. 15;

Like reference numerals in the various drawings indicate like elements.

DESCRIPTION OF THE PREFERRED EMBODIMENTS

Aspects of the present disclosure relate to methods and systems for providing suspension systems, steering systems, rotational drive systems, ergonomic position adjusting systems, safety systems, and other vehicle systems and components for wheeled vehicles, such as the wheeled vehicles and components disclosed in commonly owned and assigned U.S. Pat. No. 11,034,408, issued on Jun. 15, 2021, and commonly owned and assigned U.S. Continuation-in-Part patent application Ser. No. 17/348,069, filed Jun. 15, 2021 by LiteCycle, Inc. of Vancouver, WA and entitled VEHICLE AND VEHICLE COMPONENTS, now U.S. Pat. No. 11,999,435, issued Jun. 4, 2024, both of which are hereby incorporated herein by reference in their entireties. Some aspects of the present disclosure relate to methods and systems for providing variable path suspension systems and multi-axis steering systems that may be used in vehicles such as bicycles, motorcycles, automobiles, off-road vehicles, or any other desired vehicle. Variable path suspension systems may utilize multiple suspension assemblies or systems to allow a suspended assembly such as a wheel, tread, ski, skid, float, or any other desired suspended assembly to move along a variable path relative to the rest of the vehicle. The variable path functionality may allow the suspension system to respond to a wide variety of obstacles or terrain while providing improved stability and control of the vehicle. Multi-axis steering systems may utilize multiple assemblies or system to steer or manipulate a steerable wheel of the vehicle.

Figure 1:
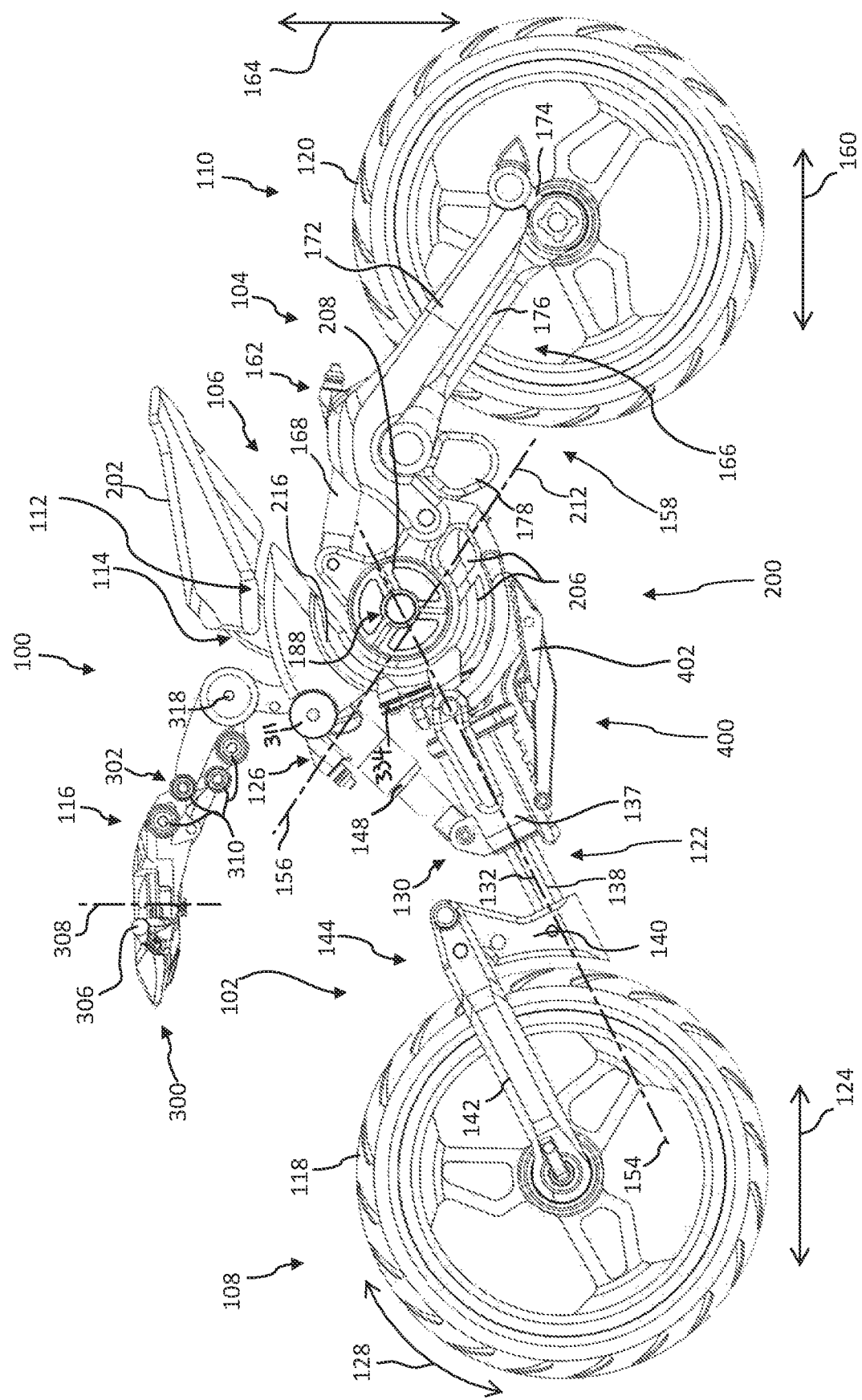
FIG. 1 is a left side view of a motorcycle in accordance with aspects of the present invention.
Figure 2:
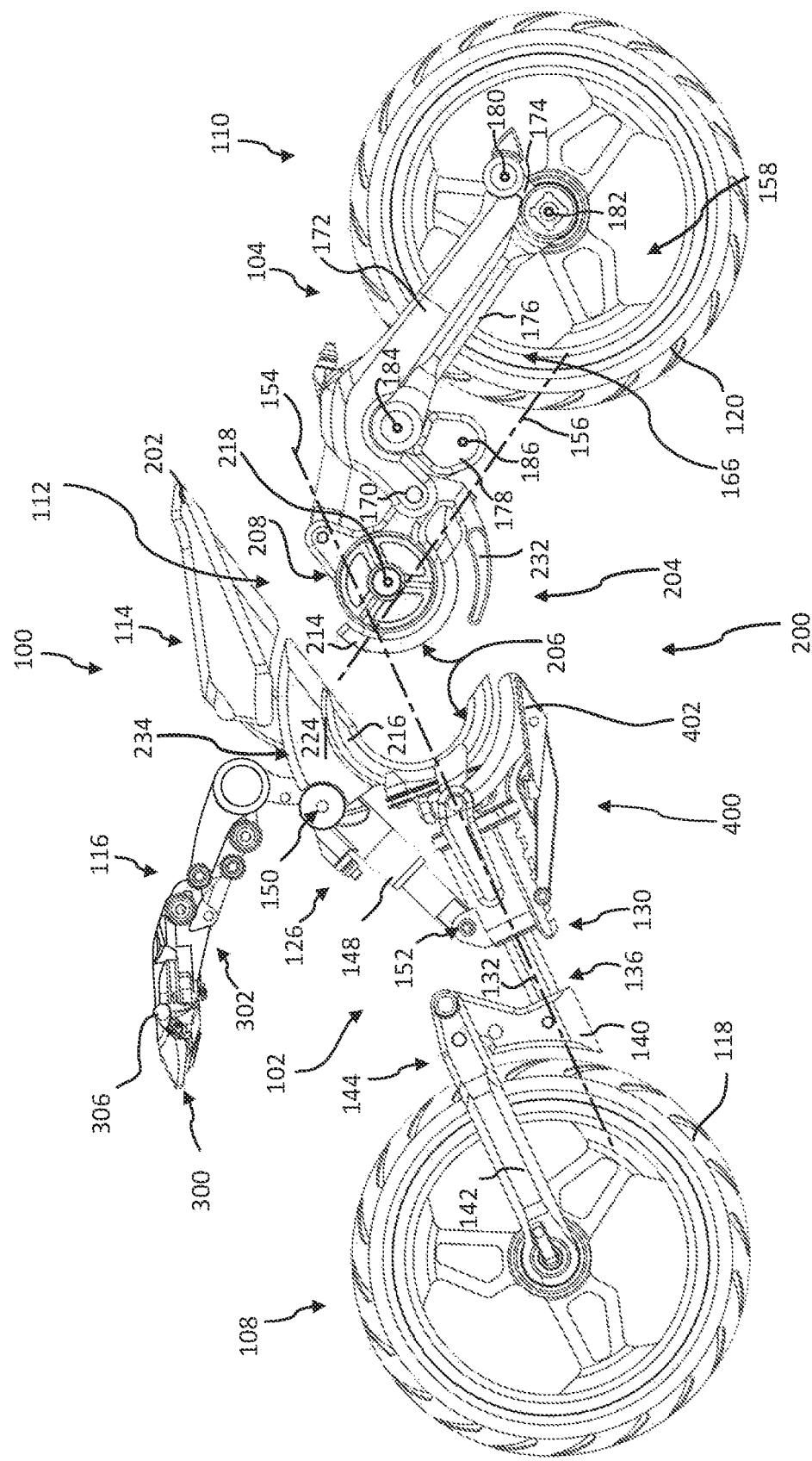
FIG. 2 is a partially exploded left side view of the motorcycle of FIG. 1.

Referring now to FIGS. 1 and 2, the present disclosure provides for a wheeled vehicle 100 designed in accordance with this disclosure and the disclosure of the above mentioned U.S. Patent and U.S. Patent Application. The vehicle 100 includes a main vehicle body 106 and a front and a rear suspended assembly 108 and 110 that are configured to support main body 106 of vehicle 100. In this embodiment, main body 106 includes a hub assembly or system 112, a seat support assembly or system 114, and a handlebar support assembly or system 116. Front suspended assembly 108 includes a front wheel 118 that is movably connected to main body 106 of vehicle 100 using front suspension system 102. Rear suspended assembly 110 includes a rear wheel 120 that is movably connected to main body 106 of vehicle 100 using rear suspension system 104. Suspended assemblies 108 and 110 are configured to support vehicle 100 and assist in providing directional control of the vehicle and stability in a lateral direction relative to a normal straight-ahead direction of travel of the vehicle.

As will be described in more detail hereinafter, front suspension system 102 and rear suspension system 104 of vehicle 100 are different variations of suspension systems that are both designed in accordance with aspects of this disclosure. Although front suspension system 102 will be described herein as being a suspension system for a steerable front wheel of a motorcycle and rear suspension system 104 will be described herein as being a suspension system for a rear wheel of a motorcycle, it should be understood that the invention is not limited to these specific applications. Instead, various aspects of front suspension system 102 and/or rear suspension system 104 may be used to provide a suspension system for a front wheel or a rear wheel for any desired vehicle. Furthermore, it should be understood that aspects of the suspension systems described herein may be used in any desired suspended assembly in any desired application and remain within the scope of the invention. This includes suspended assemblies that have support elements such as a wheel, a ski, a skid, a float, a tread, or any other support element for a suspended assembly.

Referring now to FIGS. 1-6, a first embodiment of a suspension system in accordance with aspects of this disclosure will be described in more detail with reference to front suspension system 102. Front suspension system 102 includes a first front suspension system 122 that movably connects front suspended assembly 108 (which in this example includes wheel 118) to hub 112 and main vehicle body 106. First front suspension system 122 controls the movement of front suspended assembly 108 relative to main vehicle body 106 through a range of motion along a first front path 124 that is primarily perpendicular to the lateral direction relative to the normal straight-ahead direction of travel of vehicle 100. This allows front suspension system 102 to support main body 106 of vehicle 100 while also providing lateral stability to the vehicle. In this example, first front path 124 is primarily horizontal and parallel with the normal straight-ahead direction of travel of the vehicle 100.

Front suspension system 102 also includes a second front suspension system 126 (FIGS. 1-7B) that controls movement of front suspended assembly 108 relative to main vehicle body 106 through a range of motion along a second front path 128 (FIG. 1) that is also primarily perpendicular to the lateral direction when vehicle 100 is traveling in the normal straight-ahead direction. This again allows front suspension system 102 to support main body 106 of vehicle 100 while also providing lateral stability to the vehicle. In this example, second front path 128 is primarily vertical and perpendicular to the normal straight-ahead direction of travel of the vehicle.

In accordance with some aspects of this disclosure, second front path 128 of second front suspension system 126 is different than first front path 124 of first front suspension system 122. With this configuration, front suspension system 102 may use the combination of the range of motion of first front suspension system 122 and the range of motion of second front suspension system 126 to provide an overall range of motion for the suspended assembly relative to the main body that is defined by a surface area when the vehicle is traveling in the normal straight-ahead direction. As is the case in the embodiment being described, this surface area may be defined by a planar surface area in configurations in which the first path and the second path fall entirely within a common plane. Alternatively, this surface area may be defined by a curved surface area in configurations in which at least one of the first or second paths is a curved path that is not entirely coplanar with the other path.

Although first front path 124 associated with first front suspension system 122 has been described as being primarily horizontal and second front path 128 associated with second front suspension system 126 has been described as being primarily vertical, this is not a requirement. Instead, it should be understood that first and second front suspension systems 122 and 126 may be oriented in any desired manner and remain within the scope of the invention. This may cause first and second front paths 124 and 128 to be paths that are not primarily horizontal and vertical. As would be understood by one skilled in the art, the variable path feature associated with using a first and a second front suspension system as described herein would be provided regardless of the orientation or angles of the first and second paths associated with the two suspension systems so long as the two paths are different from one another.

In the specific embodiment of front suspension system 102 that is being described, front suspended assembly 108 and front wheel 118 are steerable. In the illustrated embodiment of FIGS. 1-6, the front suspended assembly 108 is fixed relative to the first front suspension system 122 during operation of the vehicle 100. This is in contrast to that described in U.S. Pat. No. 11,034,408 in which the front suspended assembly is moveable relative to the first front suspension system as described therein. First front suspension system 122 and second front suspension system 126 cooperate to movably connect front suspended assembly 108 to the main vehicle body 106. Also in contrast to steerable front suspended assembly 108 and front wheel 118 of vehicle 100, the front wheel 108 of vehicle 100 is not independently steerable in relation to the first front suspension system 122, as will be described in more detail further below. Thus, unlike that of vehicle 100, the suspension systems 122 and 126 of vehicle 100 do not provide for a multi-axis steering system on their own, instead, suspension systems 122 and 126 cooperate with the functionality of the hub 112 to provide a multi-axis steering system for the vehicle 100, as will be described in further detail below.

Figure 3A:
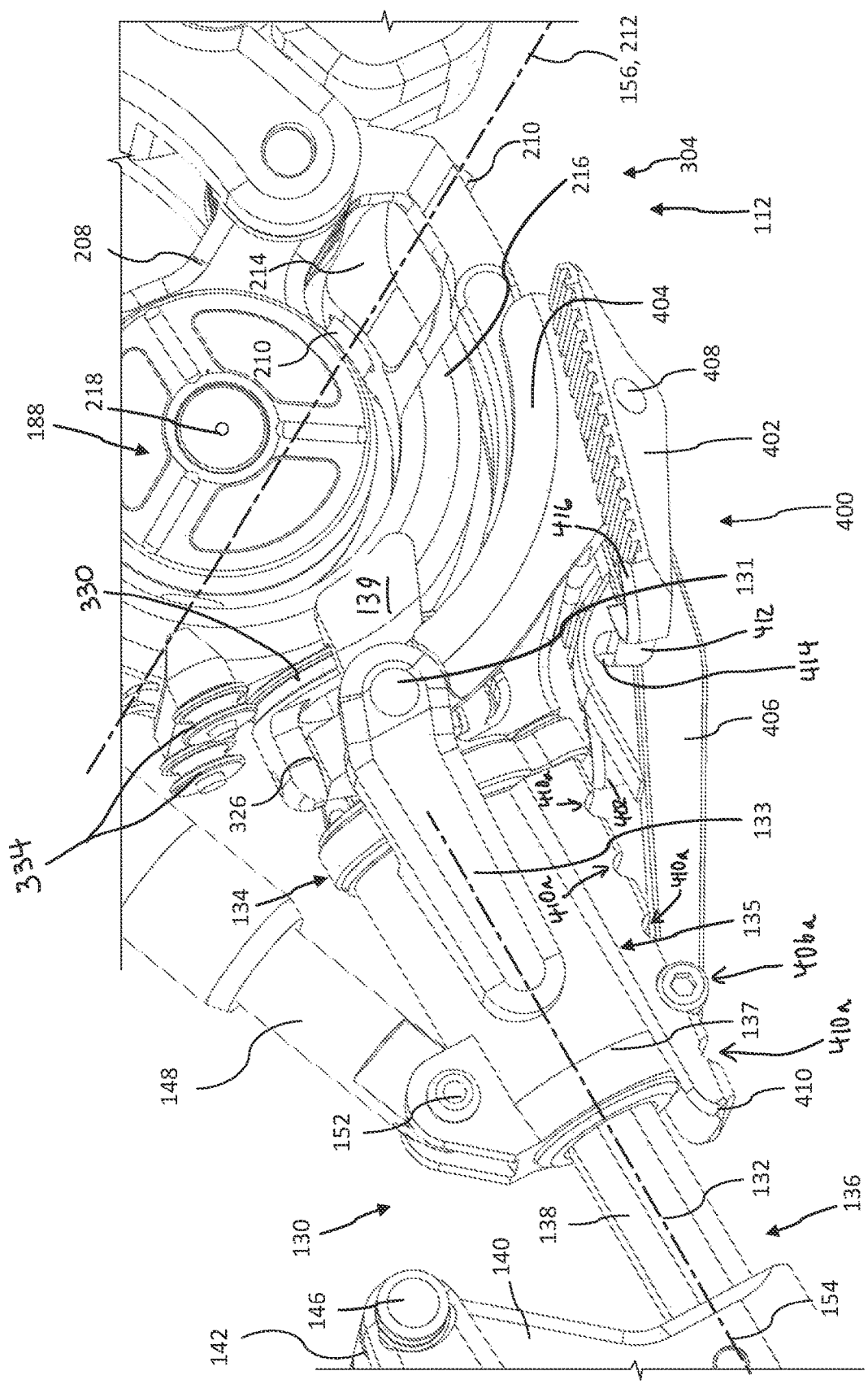
FIGS. 3A-3B are sequential enlarged front-left side perspective views of a portion of a hub of the motorcycle of FIG. 1, depicting two possible positions of a foot platform of an adjustable rider support system.

As best illustrated in FIGS. 3A-5, first front suspension system 122 of front suspension system 102 includes a telescopic shock absorber 130 having a longitudinal axis 132 with a first end 134 and a second end 136. First end 134 of telescoping shock absorber 130 is pivotally attached to hub 112 of main vehicle body 106 at pivot point 131 (FIGS. 3A and 3B). The telescoping shock absorber 130 includes a first axis steering system or assembly in the form of a steering tube assembly 135 that includes an outer steer tube 137 and an inner steer tube 138. The inner steer tube 138 is telescopically movable along longitudinal axis 132 of telescopic shock absorber 130 relative to the outer steer tube 137, first end 134 of the telescopic shock absorber 130, and main vehicle body 106. A strut 133 is fixed to the outer steer tube 137 (FIGS. 3A and 3B) and includes an extension that extends beyond the first end 134 of the telescoping shock absorber 130 and provides pivot point 131 at which the telescoping shock absorber 130 pivotally connects with the main vehicle body 106. The outer steer tube 137 telescopically supports the inner steer tube 138 and second end 136 of telescoping shock absorber 130. The inner steer tube 138 of steering tube assembly 135 is rotatable about longitudinal axis 132 of telescopic shock absorber 130 relative to the outer steer tube 137, first end 134 of the telescopic shock absorber 130, and main vehicle body 106. Movable second end 136 of telescopic shock absorber 130 controls movement of front suspended assembly 108 relative to main vehicle body 106 through the range of motion along first front path 124.

Figure 6:
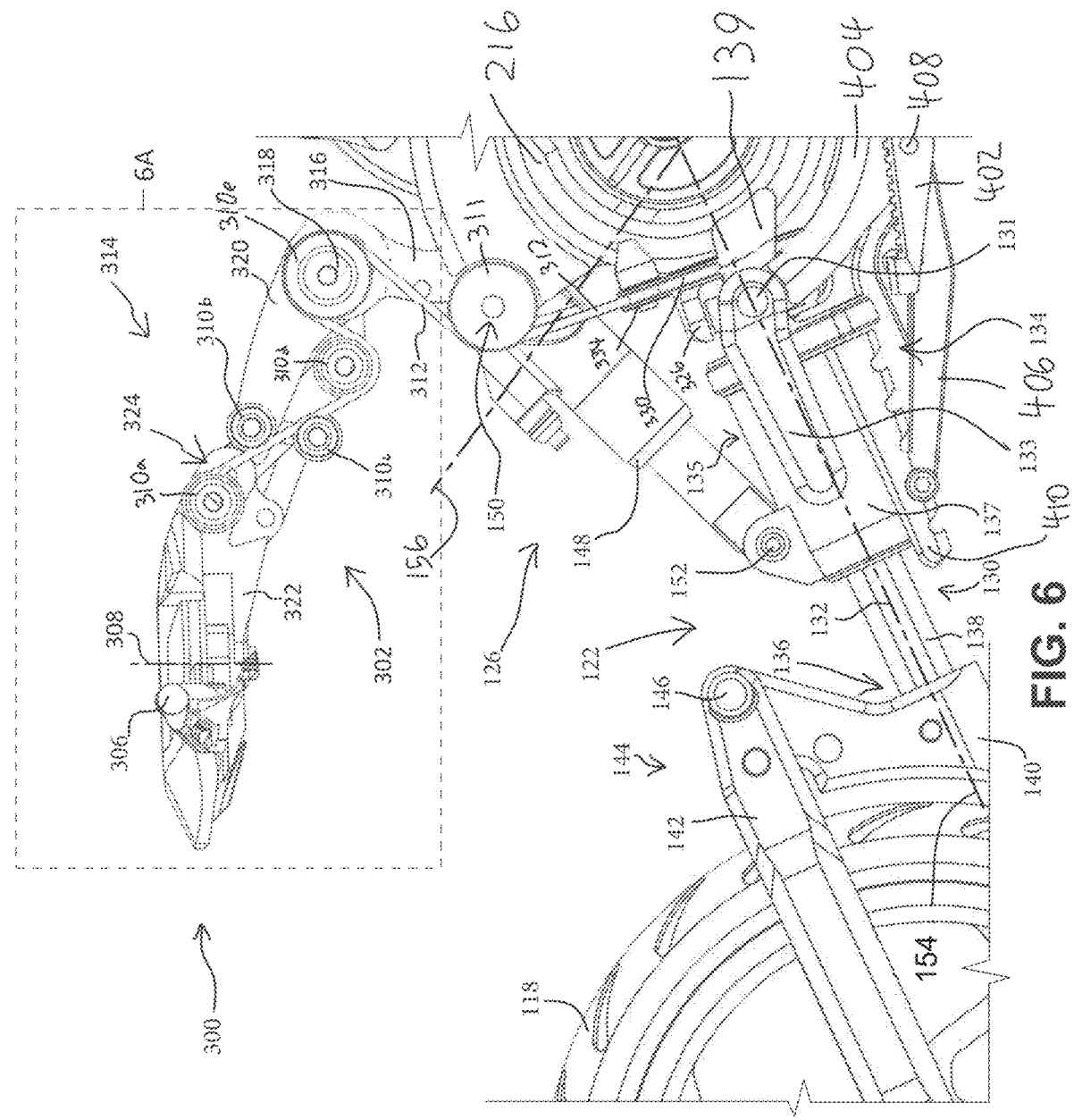
FIG. 6 is an enlarged partial left side view of the motorcycle of FIG. 1.

As shown best in FIGS. 1, 2, and 6, front suspended assembly 108 of the vehicle includes a first link 140 and a second link 142 which form a fixed front fork assembly 144. The fixed front fork assembly 144 of vehicle 100 retains the front suspended assembly 108 in a generally consistent position relative to the second end 136 of the telescopic shock absorber 130 (FIG. 1) and so differs from the articulated linkage 138 of vehicle 100 in which the front suspended assembly 108 is movable relative to the second end 136 of telescopic shock absorber 130 (see FIG. 1). The first link 140 is fixed to the second end 136 of the telescopic shock absorber 130 and the second link 142 is retained in a set or locked position relative to the first link 140 during operation of the vehicle 100 (FIG. 1). Fixed front fork assembly 144 connects front suspended assembly 108 to first front suspension system 122. In the illustrated embodiment, the first link 140 and second link 142 are fixed relative to one another when the vehicle 100 is operation.

Figure 3B:
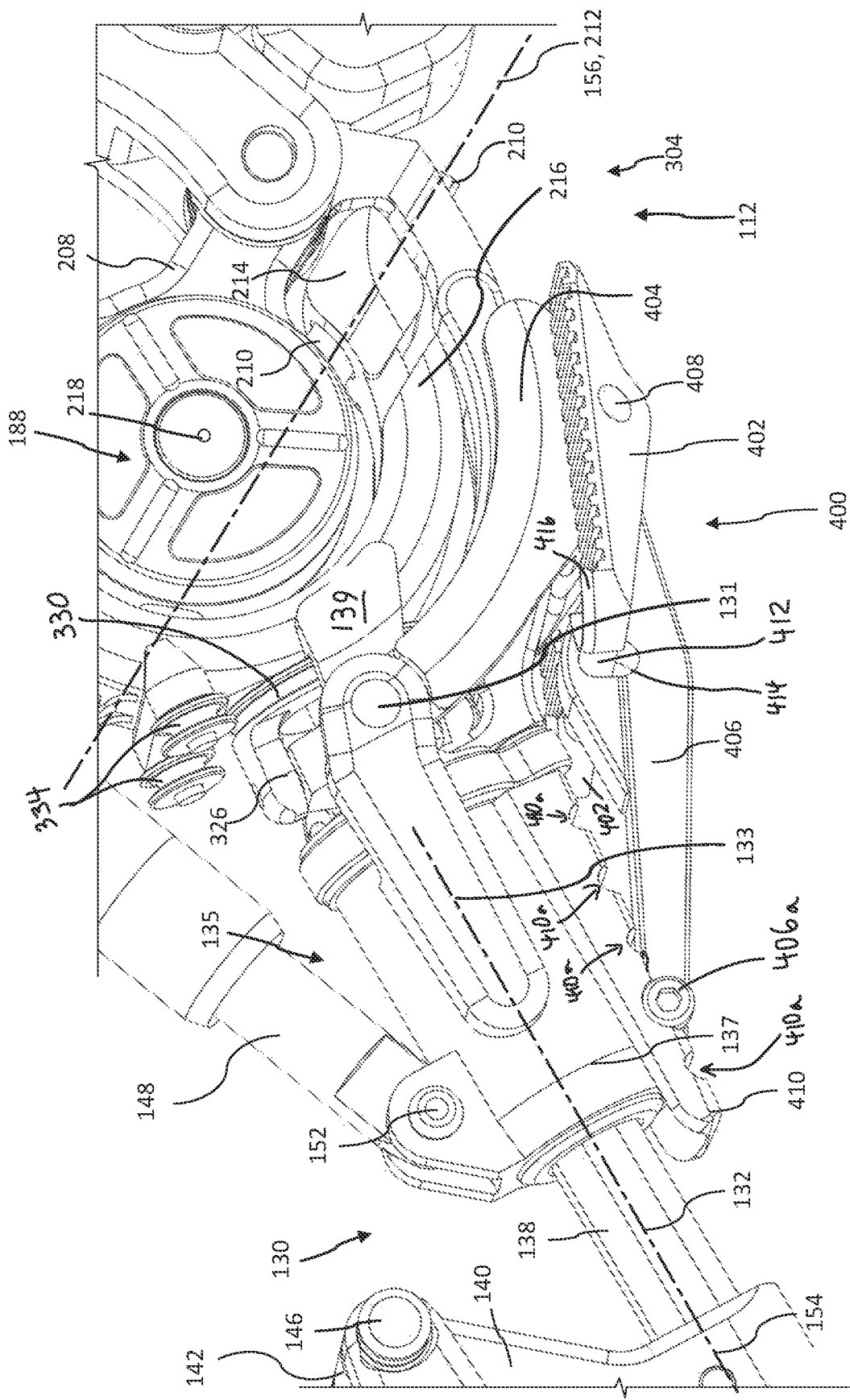

A pivot point of first link 140 is pivotally connected to a pivot point of second link 142 at a fork pivot point 146 (FIGS. 3A-3B and 6). As such, when the vehicle 100 is not in operation, a user may release the front fork assembly 144, such as by removing a locking pin or dowel between the links 140 and 142, to allow the second link 142 to pivot relative to the first link 140 about the fork pivot point 146. For example, when not riding the vehicle 100, a user may wish to store the vehicle and may release the front fork assembly 144 so that the front wheel 118 and second link 142 may rotate upward and toward the main vehicle body 106 such that the vehicle 100 occupies a smaller footprint and requires less space for storage. It is contemplated that the first link 140 may rotate downward and toward main vehicle body 106, as opposed to upward, to provide an added layer of safety and security to the front fork assembly 144.

Optionally, the first and second links 140 and 142 of front fork assembly 144 may be fully fixed to one another and the pivot point 146 omitted, thus simplifying the front fork assembly. Further optionally, it will be appreciated that the second link 142 may be dynamically coupled to the first link 140 such that the second link 142 may pivot relative to the first link 140, telescopic shock absorber 130, and main vehicle body 106 during operation of the vehicle 100. For example, a shock absorber, a polymer or coil spring, or other readily providable biasing and dampening arrangement may be provided between the first and second links 140 and 142 to retain a generally consistent orientation between the links and to absorb shock and vibration experienced at the links. It is preferable that such an arrangement provide only a limited or relatively small amount of articulation between the first and second links 140 and 142 thereby limiting the travel of front wheel 118 due to the articulation of the links (e.g. front wheel travel of between about three-quarters of an inch to about one and a half inches (0.75" to 1.50")).

As best illustrated in FIGS. 1, 2, and 6, second front suspension system 126 of front suspension system 102 includes a shock absorber 148 that is connected between telescopic shock absorber 130 and an upper-front portion of the main vehicle body 106. As shown best in FIG. 6, in this specific embodiment, shock absorber 148 is pivotally mounted to main vehicle body at a first pivot point 150 and pivotally mounted to telescopic shock absorber 130 at a second pivot point 152. The second front suspension system 126 of front suspension system 102 cooperates with the pivotable telescopic shock absorber 130 to permit the front suspended assembly 108 to move relative to the main vehicle body 106 while retaining a generally consistent orientation with the second end 136 of the telescopic shock absorber 130 (FIG. 1). In this embodiment, shock absorber 148 is connected to the telescopic shock absorber 130 such that it controls movement of front suspended assembly 108 relative to main vehicle body 106 through the range of motion along second front path 128 (FIG. 1). Shock absorber 148 also biases the telescopic shock absorber 130 into a position that allows front suspension system 102 to support main vehicle body 106 while allowing for the range of motion of the front suspended assembly 108 along second front path 128.

Although first front suspension system 122 of vehicle 100 has been described as being provided by a telescoping shock absorber 130 and second front suspension system 126 of vehicle 100 has been described as being provided by shock absorber 148 between the telescoping shock absorber 130 and main vehicle body 106, this is not a requirement of the invention. Instead, it should be understood that the first and second suspension systems may be provided by any suitable and readily providable suspension system. This includes various spring suspension systems with separate dampeners, compressible foam or polymer mounts, torsion bars with dampeners, various multi-link suspension systems, or any other suitable and readily providable suspension system.

As previously mentioned, front suspended assembly 108 of front suspension system 102 may be a steerable suspended assembly. The front wheel 118 of vehicle 100 is not independently steerable relative to the front suspension system 102, unlike the vehicle described in U.S. Pat. No. 11,034,408. The multi-axis steering system of vehicle 100 is provided by a first steering axis 154 and a second steering axis 156. The first steering axis 154 corresponds to longitudinal axis of telescoping shock absorber 130 and extends or passes through the main vehicle body 106 (FIGS. 1 and 2). The first steering axis 154 is identical or substantially similar in function as the second steering axis 168 of the vehicle described and illustrated in U.S. Pat. No. 11,034,408 (see FIG. 1 of U.S. Pat. No. 11,034,408). The second steering axis 156 extends or passes through the main vehicle body 106 near a central portion of the vehicle 100 and rearward of the telescoping shock absorber 130 (FIGS. 1-5). The second steering axis 156 is associated with a position adjusting assembly or system 200 of vehicle 100. The position adjusting assembly 200 will be discussed in detail below.

Figure 7A:
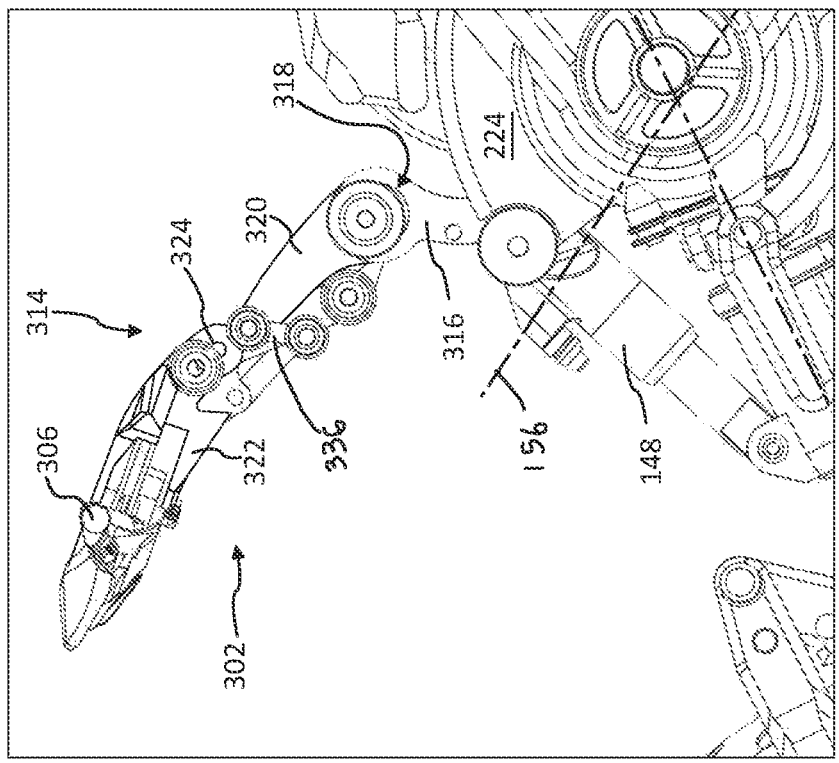
FIGS. 7A-7B are sequential partial left side views of the motorcycle of FIG. 1, depicting two possible positions of a cable steering system depicted with a cable of the steering system omitted to illustrate a handlebar support linkage.
Figure 7B:
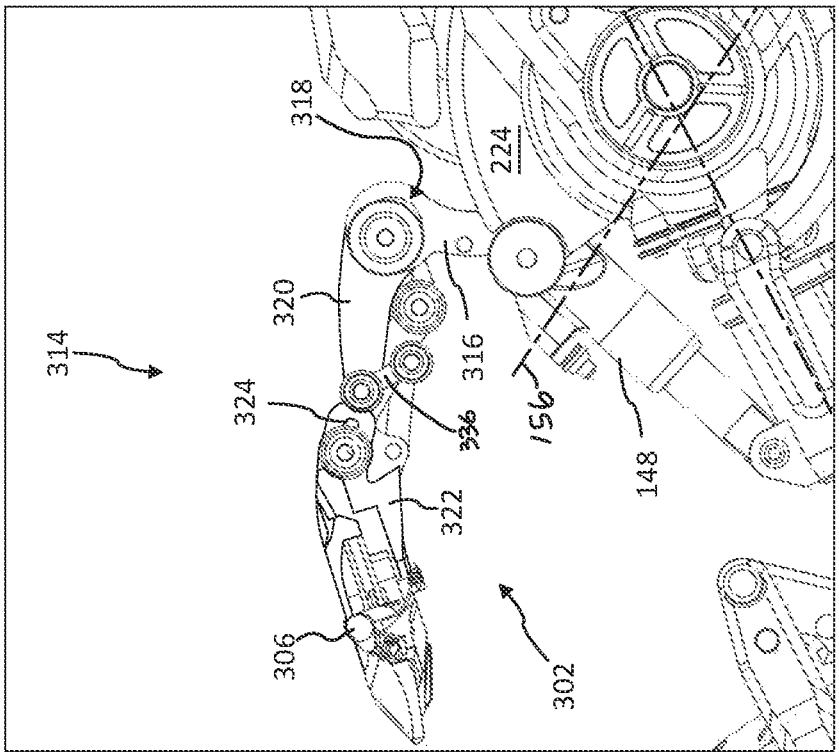
Figure 8:
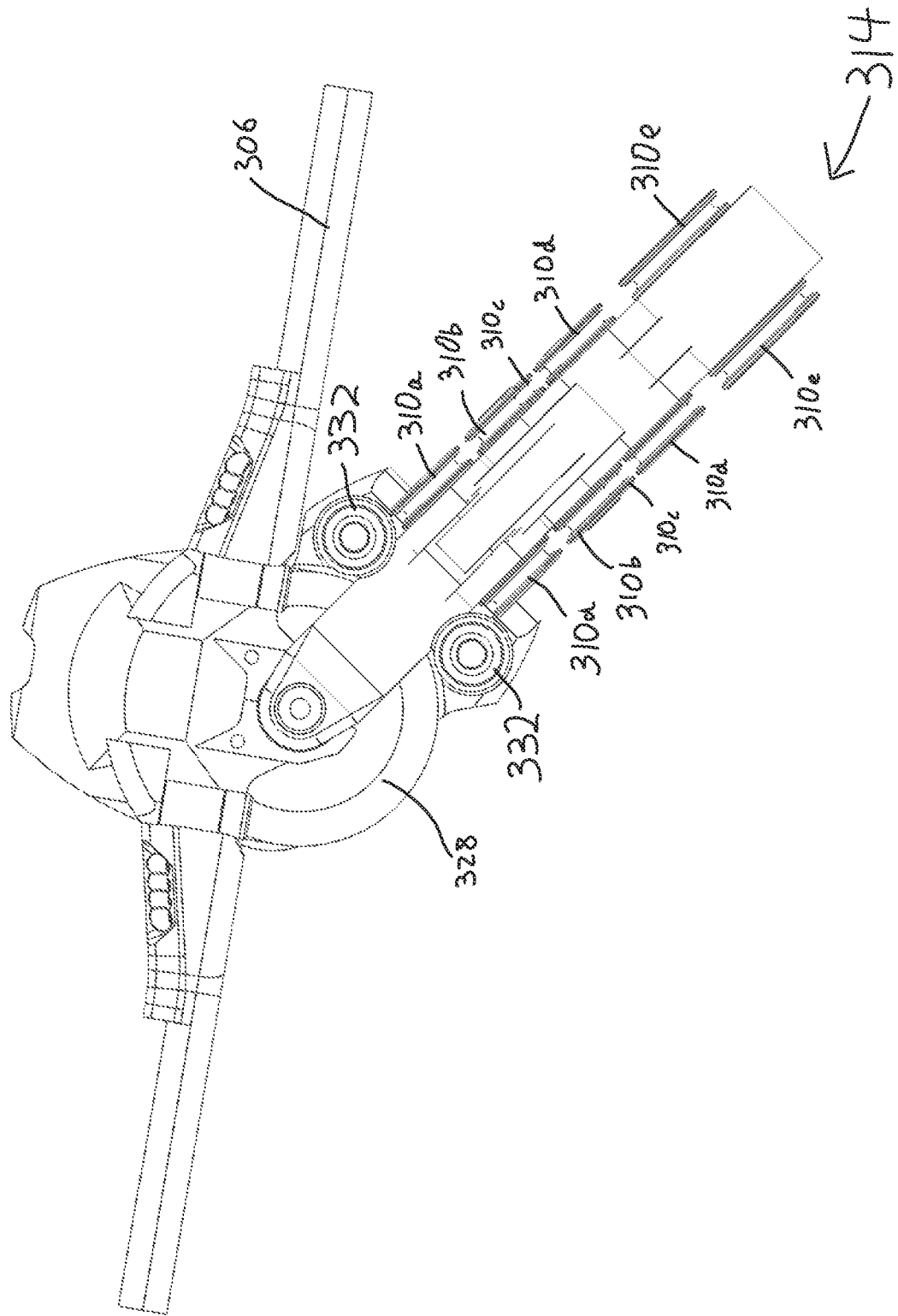
FIG. 8 is a bottom plan view of a handlebar, handlebar support, and a portion of the cable steering system of the motorcycle of FIG. 1, depicted with handlebar turned to one side.
Figure 9:
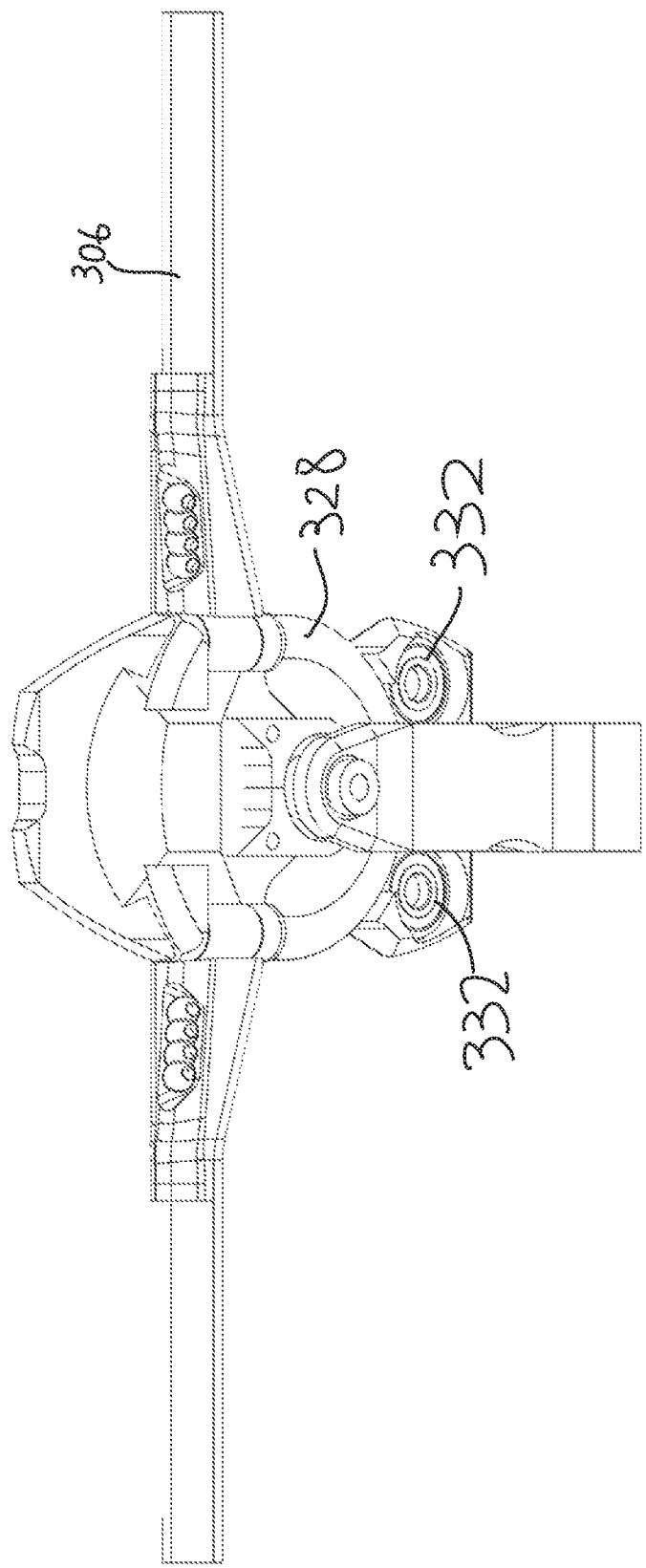
FIG. 9 is a front-bottom view of the handlebar and portion of the cable steering system of FIG. 8.

In the illustrated embodiment, second end 136 of telescopic shock absorber 130 is rotatable about longitudinal axis 132 of telescopic shock absorber 130 relative to first end 134 of the telescopic shock absorber 130 and main body 106 of vehicle 100. This configuration of telescoping shock absorber 130 provides the first steering axis 154 that corresponds to longitudinal axis 132 of telescoping shock absorber 130 (FIG. 1). As will be described in more detail hereinafter, the rotation or pivoting of second end 136 of telescoping shock absorber 130 causes front suspended assembly 108 to rotate or pivot about first steering axis 154. In the illustrated embodiment of FIGS. 1-7B, this rotation or pivoting of second end 136 of telescoping shock absorber 130 is controlled by a cable steering system or assembly 300 that includes a first steering axis steering control system or assembly 302 that includes a steering cable 312, a plurality of pulleys 310 coupled to the handlebar support 116, and a plurality of pulleys 311 coupled to a portion of the hub 112 (FIGS. 6-7B). The cable steering system 300 will be described in further detail below. However, it will be appreciated that the rotation and pivoting of second end 136 may be controlled by any suitable and readily providable steering assembly. This may include, but is not limited to a hydraulic steering assembly, a pneumatic steering assembly, other forms of cable steering assemblies, a rack and pinion steering assembly, or a mechanical push rod steering assembly.

Depending upon the specific requirements of a particular application, the first front suspension system 122, and therefore the range of motion of the first front suspension system 122 along the first path 124, may be oriented in any desired orientation relative to the vehicle 100. For example, first front suspension system 122 and first front path 124 may be primarily horizontal and parallel with the normal straight-ahead direction of travel of vehicle 100. However, as best illustrated in FIG. 1, first front suspension system 122 and first front path 124 may be oriented at a slight angle from horizontal. For example, this angle may be in the range of about zero to thirty degrees (0°-30°) from horizontal. Setting this angle to a particular angle for a specific application may allow the overall suspension system to be tuned to provide a desired set of operating characteristics for the specific application.

In a similar manner, the specific configuration of second front suspension system 126 determines the relative shape and orientation of the range of motion of front suspended assembly 108 along second path 128. In the embodiment described above, second path 128 is a linear curved path relative to the position of second front suspension system 126. Again, it should be understood that the specific configuration of second front suspension system 126 may be arranged to provide desired suspension characteristics. This ability to design the configuration of the suspension system to provide desired suspension characteristics again allows the overall suspension system to be tuned to provide a specific set of operating characteristics for a specific application.

As mentioned above, the combination of the ability of second front suspension system 126 to move through a range of motion along second path 128 and first front suspension system 122 to move through a range of motion along first front path 124 allows front suspended assembly 108 to move through a variable path. In accordance with aspects of this disclosure, this variable path suspension system may be used to allow the suspension system to respond to a wide variety of obstacles or terrain while providing improved stability and control of the vehicle.

As also mentioned above, the combination of the range of motion of first front suspension system 122 and the range of motion of second front suspension system 126 provide an overall range of motion for the front suspended assembly 108 relative to the main body 106 that is defined by a surface area when the vehicle is traveling in the normal straight-ahead direction. However, it should be understood that the addition of a second steering axis, such as second steering axis 156 as referenced above for position adjusting assembly 200, introduces another degree of freedom for an overall suspension system such as front suspension system 102. This means that front suspension system 102 still provides a range of motion for the front suspended assembly 108 relative to the main body 106 that is defined by a surface area when the vehicle is traveling in the normal straight-ahead direction. However, this configuration with a second steering axis also allows an overall range of motion for front suspended assembly 108 relative to main body 106 that is defined by a volume rather than a surface area when the range of motion associated with the pivoting of the second steering axis is included in the overall range of motion of the suspended assembly relative to the main vehicle body.

Figure 5:
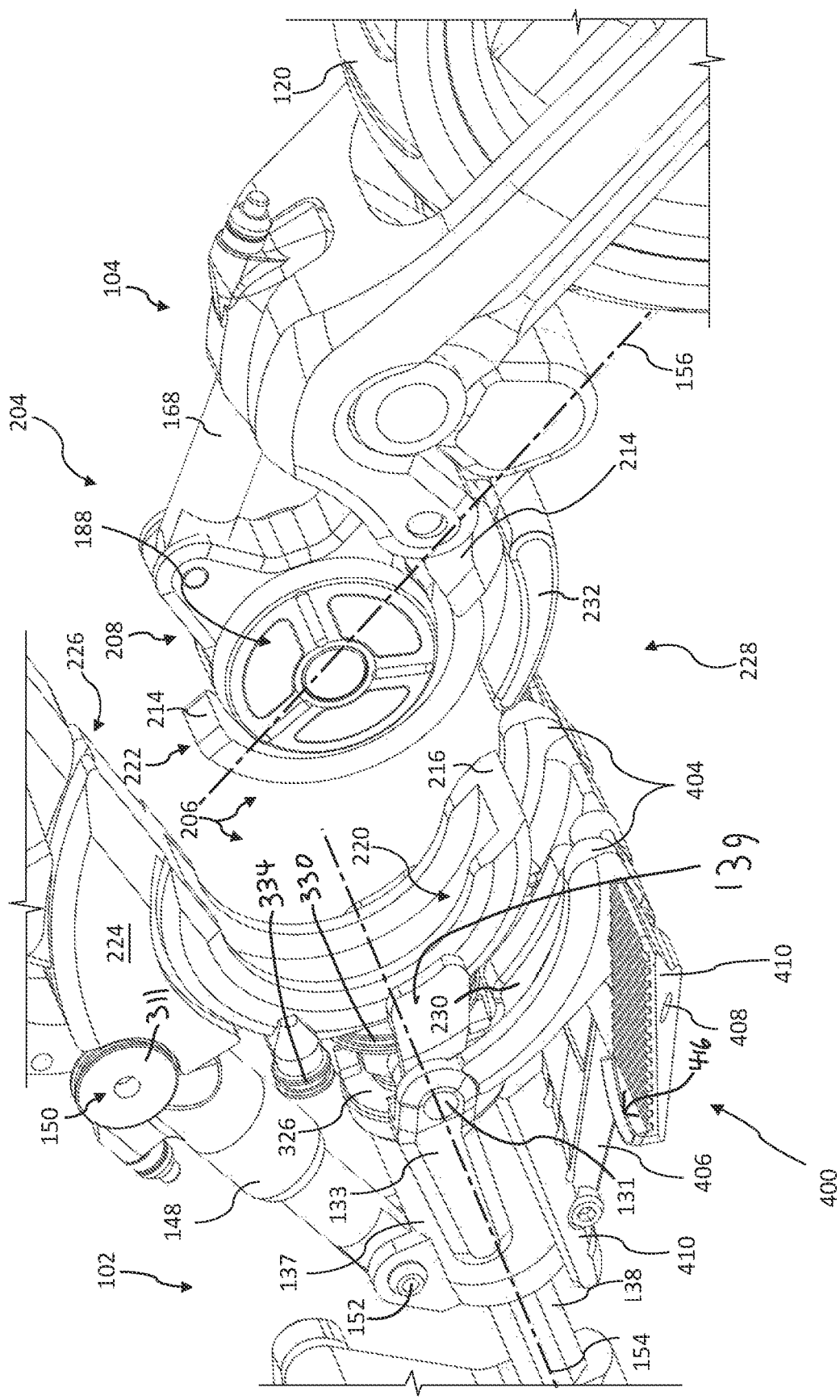
FIG. 5 is a partially exploded rear-left side perspective view of the hub portion of the motorcycle of FIG. 1.

Referring now to FIGS. 1, 2, and 5, a second embodiment of a suspension system in accordance with aspects of this disclosure will be described in more detail with reference to rear suspension system 104. In a manner similar to that described above for front suspension system 102, suspension system 104 includes a first rear suspension system 158 that movably connects a rear suspended assembly 110 (which in this example includes rear wheel 120) to hub 112 of main vehicle body 106. First rear suspension system 158 controls movement of rear suspended assembly 110 relative to main vehicle body 106 through a range of motion along a first rear path 160 that is primarily perpendicular to the lateral direction when the vehicle is traveling in the normal straight-ahead direction (FIG. 1). This allows rear suspension system 104 to support main body 106 of vehicle 100 while also providing lateral stability to the vehicle. In this example, first rear path 160 is primarily horizontal and parallel with the normal straight-ahead direction of travel of the vehicle.

Rear suspension system 104 also includes a second rear suspension system 162 that controls movement of rear suspended assembly 110 relative to main vehicle body 106 through a range of motion along a second rear path 164 that is also primarily perpendicular to the lateral direction when vehicle 100 is traveling in the normal straight-ahead direction. This again allows rear suspension system 104 to support main body 106 of vehicle 100 while also providing lateral stability to the vehicle. In this example, second rear path 164 is primarily vertical and perpendicular to the normal straight-ahead direction of travel of the vehicle.

In accordance with aspects of this disclosure, second rear path 164 of second rear suspension system 162 is different than first rear path 160 of first rear suspension system 158. With this configuration, rear suspension system 104 may use the combination of the range of motion of first rear suspension system 158 along first rear path 160 and the range of motion of second rear suspension system 162 along second rear path 164 to provide a combined range of motion for rear suspended assembly 110 relative to main body 106 that is defined by a surface area. In the embodiment being described, this surface area is defined by a planar surface area. As mentioned above and in accordance with aspects of this disclosure, this configuration allows rear suspended assembly 110 to move through a variable path relative to main vehicle body 106 in response to obstacles. This variable path suspension system may be used to allow the suspension system to respond to a wide variety of obstacles or terrain while providing improved stability and control of the vehicle.

Although first rear path 160 associated with first rear suspension system 158 has been described as being primarily horizontal and second rear path 164 associated with second rear suspension system 162 has been described as being primarily vertical, this is not a requirement. Instead, as mentioned above for front suspension system 102, the suspension systems may be oriented in any desired manner such that the paths defined by the range of motion associated with the suspension systems are oriented at any desired orientation or angle relative to the direction of travel of the vehicle. It should be understood that any of these configurations remain within the scope of the invention.

As illustrated best in FIGS. 1-2, suspension system 104 includes an articulated linkage 166 that connects rear suspended assembly 110 to hub 112 of main vehicle body 106. In this embodiment, second rear suspension system 162 includes a biasing and dampening arrangement in the form of a shock absorber 168 connected between hub 112 of main vehicle body 106 and articulated linkage 166 to control movement of rear suspended assembly 110 relative to main vehicle body 106 through the range of motion along second rear path 164. While the biasing and dampening arrangement of second rear suspension system 162 is described as a shock absorber 168, it will be appreciated that this is not a requirement. Instead, any suitable and readily providable biasing and dampening arrangement or system may be used. This includes various spring arrangements with separate dampeners, compressible foam or polymer mounts, torsion bars with dampeners, or any other suitable and readily providable biasing and dampening arrangement.

In the case of rear suspension system 104, as best shown in FIGS. 1-2, articulated linkage 166 includes a first link in the form of an upper swing arm 172, a second link 174, a third link 176 (later described as a drive link), and a fourth link 178 (later described as an articulating drive transmitting link). The upper swing arm 172 includes a fixed swing arm extension positioned proximate the forward portion of the swing arm 172 and coupled to the fourth link 178 at pivot point 186. The swing arm extension moves with the swing arm 172 as it moves relative to the main vehicle body 106.

Each of the links of the articulated linkage 166 has a first and a second spaced apart pivot point, while the swing arm extension includes a single pivot point at pivot point 186 proximate the distal end of the extension (FIG. 2). In this embodiment, articulated linkage 166 connects rear suspended assembly 110 directly to hub 112 of main vehicle body 106. The first pivot point of first link/swing arm 172 is pivotally connected to hub 112 of main vehicle body 106 at a first articulated linkage or first swing arm pivot point 170. The second pivot point of first link 172 is pivotally connected to the first pivot point of second link 174 at a second articulated linkage or second swing arm pivot point 180. The second pivot point of second link 174 and the first pivot point of third link/drive link 176 are pivotally connected to one another at a third articulated linkage pivot point 182. The second pivot point of third link 176 is pivotally connected to the first pivot point of fourth link 178 at a fourth articulated linkage pivot point 184. The second pivot point of fourth link 178 is pivotally connected to swing arm extension at a fifth articulated linkage pivot point 186. The swing arm extension is fixed to a lower portion of the swing arm 172 proximate to, but spaced apart from, the swing arm pivot point 170 such that the extension moves when the swing arm 172 moves (FIG. 2). And finally, in this embodiment, rear wheel 120 of rear suspended assembly 110 is rotatably connected to articulated linkage 166 at third articulated linkage pivot point 182 (FIG. 2).

The first rear suspension system 158 may include a biasing and dampening arrangement to control the movement of rear suspended assembly 110 relative to main vehicle body 106 through the range of motion along first rear path 160 when second rear suspension system 162 is held in place. For example, a pull shock type biasing and dampening device may be provided between the articulating drive transmitting link 178 and the swing arm 172 in order to bias or pull the drive transmitting link 178 back toward the swing arm 172 when the articulated linkage 166 is articulated/extended and the drive transmitting link 178 is extended away from its initial configuration. Second rear suspension system 162 includes a biasing and dampening arrangement in the form of a shock absorber 168 connected between hub 112 of main vehicle body 106 and the swing arm 172 of articulated linkage 166 (FIGS. 1-2, 4, and 5). Shock absorber 168 controls the movement of rear suspended assembly 110 relative to main vehicle body 106 through the range of motion along second rear path 164 when first rear suspension system 158 is held in place.

The above described suspension system configurations provide variable path suspension systems that may be used in vehicles such as bicycles, motorcycles, automobiles, off-road vehicles, or any other desired vehicle. In accordance with aspects of this disclosure, these variable path suspension systems utilize multiple suspension systems to allow a suspended assembly such as a wheel, tread, ski, skid, float, or any other desired suspended assembly to move along a variable path relative to the rest of the vehicle. The use of this variable path suspension system allows the suspension system to respond to a wide variety of obstacles or terrain while providing improved stability and control of the vehicle.

Vehicle 100 may include a drive motor and a drive transmission system, similar to drive transmission arrangements and systems described in U.S. Pat. No. 11,034,408 and U.S. patent application Ser. No. 17/348,069. For example, an electric drive motor 188 may be located within the main vehicle body 106 near the hub 112 and a drive transmission system may be provided to transfer torque generated by the motor 188 to the rear wheel 120 through a series of drive members or elements (e.g. shaft drives, chains, belts, or the like). The torque transfers occur at various pivot points of the articulated linkage 166, including pivot points 170, 182, 184, and 186. As such, the drive transmission system for vehicle 100 functions in similar or substantially identical fashion to drive transmission arrangement described in the above referenced patent, with significant differences described herein. By utilizing pivot points 170, 182, 184, and 186 as torque transfer locations, the articulated linkage 166 is permitted to articulate substantially freely without being significantly constrained by the drive transmission system.

The system of pivot point torque transfers enables the weight of the motor to be centralized within the main vehicle body 106. This centralized motor positioning may reduce the amount of unsprung weight experienced at the rear wheel 120 of the vehicle 100, such as may be experienced with wheel hub motors and the like. The centralized position of motor 188 is also beneficial in providing for a balanced feel while operating the vehicle 100 and optimizing the center of gravity of the vehicle 100, while also optimizing turning capabilities as compared to traditional all wheel steering systems. Optionally, if unsprung weight is not a concern and/or if additional power is desired to drive the vehicle 100, a hub motor may be coupled to the wheel hub of the rear wheel 120 and/or the front wheel 118 in order to propel the vehicle 100. Hub motors may be used in combination with a vehicle body mounted motor and drive transmission system or as an alternative to the vehicle body mounted motor and drive transmission system. If only hub motors are utilized, the drive transmission system may be omitted without significantly affecting the function of the vehicle 100.

In exemplary embodiments utilizing a drive transmission system, a shifting system may be provided with the drive transmission system, such as similar to shifting system 228 of vehicle 100 described above. For example, a shifting system may be positioned inside of the articulating drive transmitting link 178. It will be appreciated that in an embodiment utilizing an electric drive motor there may not be a need for a shifting system as the torque output is controlled based on the electrical output supplied from the battery to the motor. On the other hand, combustion engine embodiments and human powered embodiments may benefit from a shifting system. In embodiments utilizing an electric motor and without a shifting system, planetary gears in communication with one or more of the drive members may be provided with the drive transmission system in order to reduce the RPMs output by at the output shaft of the electric motor, thereby increasing the torque output to the rear wheel 120.

A drive transmission system may be provided for vehicle 100, such as a rotational drive transmission systems similar to those described in U.S. Pat. No. 11,034,408 and U.S. patent application Ser. No. 17/348,069. The drive transmission may utilize pivot point torque transfer principles as described in the above referenced patent. For example, the rotational drive transmission for vehicle 100 may include a drive transmitting articulated linkage that makes up a portion of articulated linkage 166 of rear suspension system 104. The drive transmitting articulated linkage includes a plurality of rotational drive transmitting links that each have a first and a second spaced apart hinge point. The rotational drive transmitting links include the following links: a first rotational drive transmitting link provided between pivot points 170 and 186 of articulated linkage 166; a second rotational drive transmitting link provided by articulating drive transmission link 178 of articulated linkage 166; and a third rotational drive transmitting link provided by third link 176 of articulated linkage 166. The first and second spaced apart hinge points of the first, second, and third rotational drive transmitting links each have an associated axis of rotation that provides a pivot point for the drive transmitting articulated linkage.

In this embodiment, the first hinge point and associated axis of rotation for the first rotational drive transmitting link is located at pivot point 170 of articulated linkage 166. The second hinge point and associated axis of rotation for the first rotational drive transmitting link is located at pivot point 186 of articulated linkage 166. The first hinge point and associated axis of rotation for the second rotational drive transmitting link 178 is also located at pivot point 186 of articulated linkage 166 where link 178 is pivotally connected to swing arm extension. The second hinge point and associated axis of rotation for the second rotational drive transmitting link 178 is located at pivot point 184 of articulated linkage 166. The first hinge point and associated axis of rotation for the third rotational drive transmitting link 176 is also located at pivot point 184 of articulated linkage 166 where third link 176 is pivotally connected to link 178. And finally, the second hinge point and associated axis of rotation for third rotational drive transmitting link 176 is located at pivot point 182 of articulated linkage 166, where third link 176 is coupled to the rear wheel 120.

In accordance with aspects of this disclosure, each rotational drive transmitting link of articulated linkage 166 includes a driven member, a drive member, and a drive mechanism that allows the driven member to drive the drive member of the respective rotational drive transmitting link. Similar rotational drive transmitting links, driven members, drive members, and drive mechanisms are described in U.S. Pat. No. 11,034,408 and U.S. patent application Ser. No. 17/348,069.

Referring to FIGS. 1-5, an embodiment of a position adjusting assembly 200 designed in accordance with aspects of the present disclosure will be described with reference to vehicle 100. As mentioned above, vehicle 100 includes seat support 114, handlebar support 116, rear wheel 120, steerable front wheel 118, steering system 300, and hub 112 for interconnecting components of vehicle 100. Steering system 300 includes handlebar 306 for allowing the rider to control steerable front wheel 118. Seat support 114 includes a seat 202 for supporting the rider. In this embodiment, seat support 114 is an adjustable seat support slideably and/or pivotally connected to an upper portion of the hub 112 and handlebar support 116 is an adjustable handlebar support slideably and/or pivotally connected to hub 112. Position adjusting assembly 200 may further include a releasable position lock that is releasable by the rider when the rider is riding vehicle 100. The position lock is configured to lock the relative positions of hub 112, adjustable seat support 114, and adjustable handlebar support 116 when the position lock is not released by the rider. The above described configuration of position adjusting assembly 200 allows a rider to adjust the position of the handlebar support 116 and/or seat support 114 relative to the rest of vehicle 100 by releasing the position lock.

The hub 112 provides for many of the functions of position adjusting assembly 200 as well as providing for the second steering axis 156. In the illustrated embodiments of FIGS. 1-7B, the hub 112 includes a second axis steering system or assembly in the form of an orbital steering system 204 which provides for the interconnection of the components of vehicle 100 with the main vehicle body 106 while also enabling the vehicle 100 to be steerable about the second steering axis 156 without substantially inhibiting any of the functionality and adjustability of the components of vehicle 100. As best illustrated in FIGS. 2 and 5, the orbital steering system 204 includes a front orbital assembly 206 and a rear orbital assembly 208. The front orbital assembly 206 and rear orbital assembly 208 are pivotally connected to one another at a hub axle 210, as best shown in FIGS. 3A and 3B. The axis of the hub axle 210 defines a hub orbit axis 212 about which the orbital assemblies 206, 208 of the hub 112 are orbitally pivotable. The hub orbit axis 212 corresponds to the second steering axis 156. The rear suspension system 104 is coupled to the rear orbital assembly 208 (FIGS. 1-2 and 4-5). As described above, an electric motor 188 may be provided with vehicle 100 and may be positioned at an inner portion of a main body of the rear orbital assembly 208 (FIGS. 1, 3A, 3B, and 5). Accordingly, because the motor 188 pivots with the rear wheel 120 (i.e. remains coplanar with the rear wheel) and the rear suspension system 104, vehicle 100 provides advantages over known, complex drive transmitting articulation mechanisms commonly required to maintain power to a driven wheel as the wheel articulates to turn.

Figure 17:
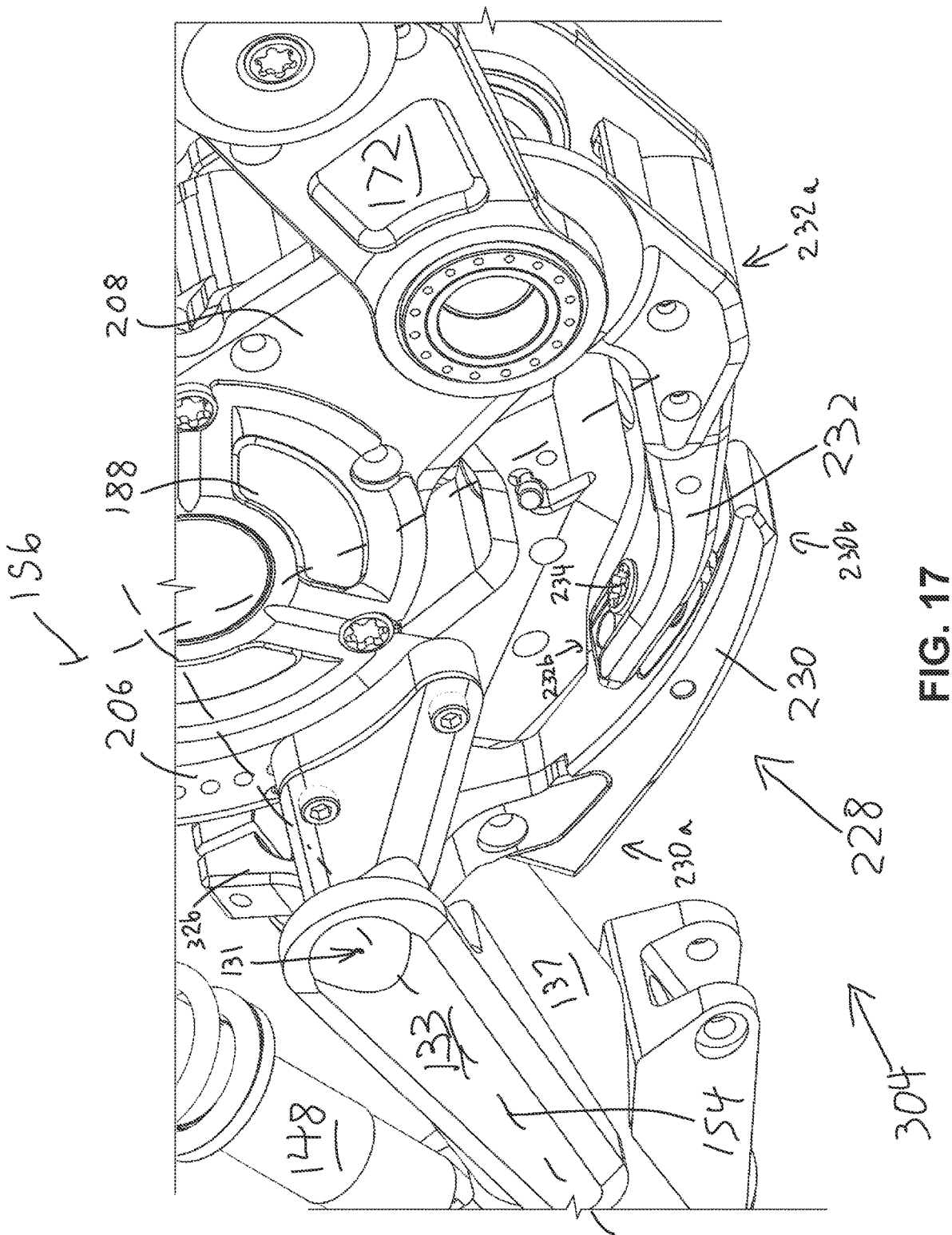
FIG. 17 is a top-side perspective view of a steering actuation linkage assembly for a motorcycle, in accordance with aspects of the present invention, the linkage assembly depicted with a hub assembly in a planar or unturned orientation.
Figure 18:
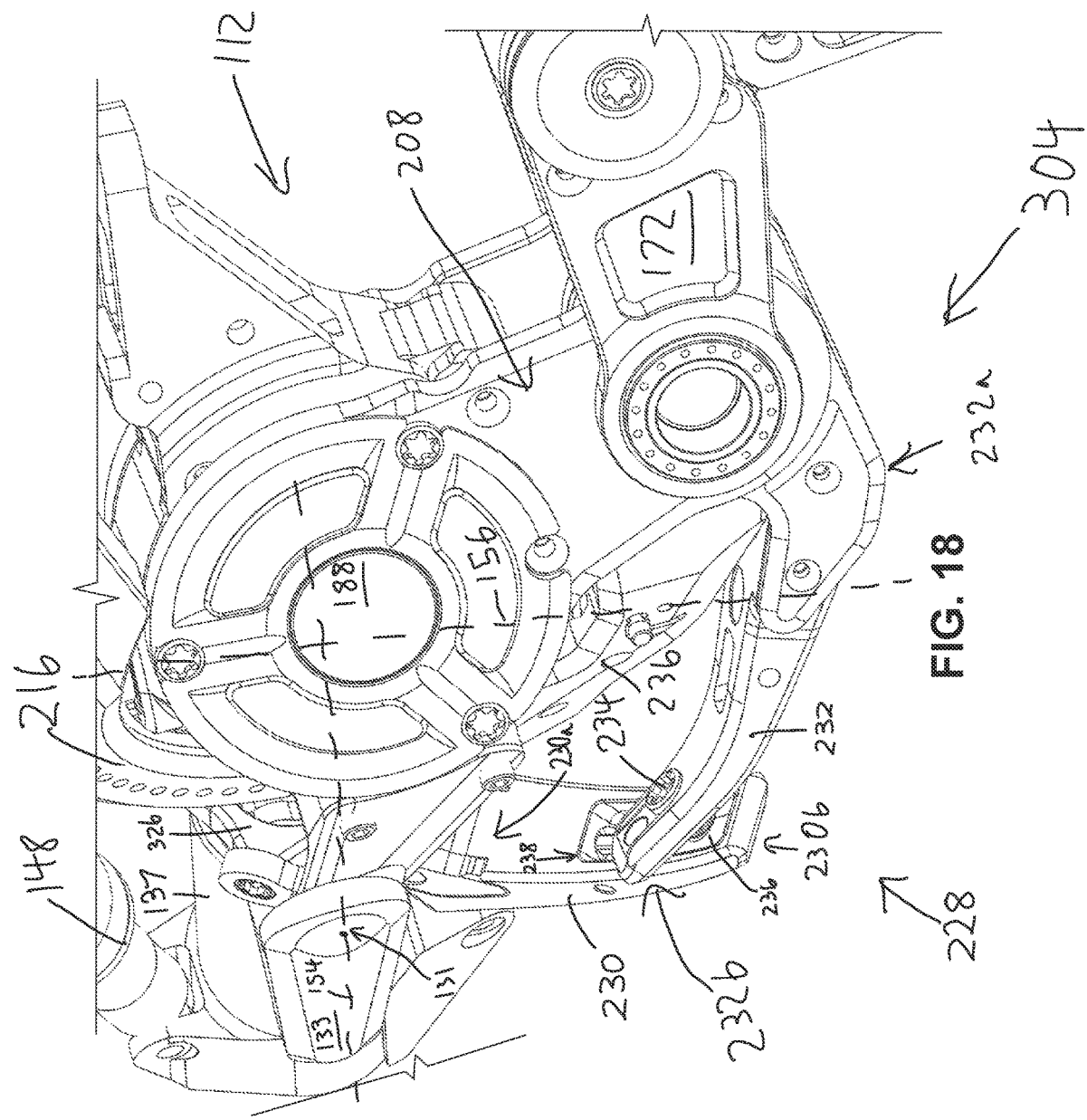
FIG. 18 is another top-side perspective view of the steering actuation linkage assembly of FIG. 17, depicted with the hub assembly in a non-planar or turned orientation.

The orbital steering system 204 is provided by the orbiting of the front orbital assembly 206 and rear orbital assembly 208 relative to one another about the second steering axis 156. When the vehicle is travelling in a normal straight-ahead direction, the hub 112 is oriented in a planar or unturned manner (FIG. 17). When the vehicle is steered or turned away from the normal straight-ahead direction of travel, the front orbital assembly 206 and rear orbital assembly 208 articulate relative to one another about the second steering axis 156 such that the hub 112 is in a turned or non-planar orientation (FIG. 18). When the vehicle 100 is turning and the hub 112 is in the turned orientation the travel path of the front wheel 118 and the rear wheel 120 are similar or substantially identical to one another. In other words, when the hub 112 is in the turned orientation, the rear wheel 120 tracks along a similar or substantially identical travel path which the front wheel 118 travelled. Thus, the orbital steering system 204, in combination with the telescopic shock absorber 130, provides for part of the multi-axis steering system of vehicle 100.

The front orbital assembly 206 is defined by a hub pivot actuator in the form of an assembly of a pair of concentric C-shaped or arcuate frames, including an outer C-frame 216 and an inner C-frame 214, as best shown in FIGS. 2 and 5. The hub pivot actuator provides for the adjustment of the wheelbase length and the angle between the first steering axis 154 and the second steering axis 156. For illustrative purposes, as shown in FIGS. 2 and 5, the inner and outer C-frames 216, 214 are detached/exploded from one another. The hub 112 may be disassembled to separate the front portion of the vehicle 100 from the rear portion, thereby facilitating compact storage and making the vehicle 100 more portable. The front suspension system 102 is coupled to the outer C-frame 216 of front orbital assembly 206, and as previously noted, the rear suspension system 104 is coupled to the rear orbital assembly 208 (FIGS. 2 and 5). Accordingly, the front suspension system 102 and rear suspension system 104 portions of vehicle 100 are therefore separable from one another by separating the C-frames 216 and 214 from one another. Optionally, the hub 112 may be selectively separable by separating the front orbital assembly 206 and rear orbital assembly 208 from one another (by removal of the hub axle 1140) such that a user may dismantle and separate the forward and rearward portions of the vehicle 100 from one another.

It will be appreciated that the hub 112 may be considered as a two-component system, wherein the rear orbital assembly 208 represents one component of hub 112 and the front orbital assembly 206 (including C-frames 216 and 214) represents another component of hub 112, with the hub axle 210 coupling the front and rear orbital assemblies 206 and 208 together. Alternatively, the hub 112 may be considered in another manner as a two-component system, wherein the outer C-frame 216 represents one component of hub 112 and the combination of the inner C-frame 214 and rear orbital assembly 208 (coupled together by the hub axle 210) represents another component of hub 112. In another alternative, the hub 112 may be considered in another manner as a three-component system in which each of the rear orbital assembly 208, the outer C-frame 216, and the inner C-frame 214 represent the three components of the hub 112.

The inner C-frame 214 and outer C-frame 216 are rotatably coupled to one another such that they may move relative to one another by pivoting around a hub actuation pivot point or axis 218, hereinafter referred to as the hub pivot axis 218 (FIGS. 2-3B). The hub pivot axis 218 is located at the concentric center of inner C-frame 214 and outer C-frame 216 and is perpendicular relative to the first steering axis 154 and the normal straight-ahead direction of travel. The rotation of the C-frames 216, 214 relative to one another provide for selective adjustment of the wheelbase length and the angle between the first steering axis 154 and the second steering axis 156. For illustrative purposes, the inner C-frame 214 and outer C-frame 216 may be considered to operate in similar fashion to a rotary bearing in which the C-frames 216 and 214 are able to rotate substantially freely relative to one another. Although, it will be appreciated that unlike a typical rotary bearing, the inner and outer C-frames 214, 216 have a less than full range of rotation (less than 360°) relative to one another, as adjacent components of the vehicle 100 and/or a rotation limiting arrangement provided with the front orbital frame assembly may limit the maximum relative rotation between the C-frames.

The C-frames 216 and 214 rotate relative to one another in a plane that is parallel to the vehicle's upright, end-to-end centerline when the vehicle is travelling in an upright position and a normal straight-ahead direction. The pivotable/rotatable relationship between C-frames 216 and 214 provides a function of the position adjusting assembly 200 in the form of vehicle ride position/height adjustment/wheelbase adjustment. Further, because the rear orbital assembly 208 is coupled to the inner C-frame 214 and contains the hub axle 210 of orbital steering system 204, the typical angle between the second steering axis 156 (which corresponds with the hub orbit axis 212 of hub axle 210) and the first steering axis 154 (which corresponds with axis 132 of telescopic shock absorber 130) is adjustable by rotating the C-frames 216 and 214 relative to one another.

It will be appreciated that a biasing and dampening arrangement may be provided between inner C-frame 214 and outer C-frame 216 to provide a suspension or shock absorbing function for the vehicle 100. Such a biasing and dampening arrangement may include springs, shock absorbers, compressible foam or polymer mounts, or any other suitable and readily providable biasing and dampening arrangement, for example.

The outer C-frame 216 includes a guide or raceway 220 defining an arcuate channel formed along the inner diameter of the outer C-frame 216 (FIG. 5). The inner C-frame 214 includes an arcuate rail 222 that is received in the raceway 220. The arcuate rail 222 includes an outer diameter that is somewhat smaller than the inner diameter of the raceway 220. As such, the arcuate rail 222 is dimensioned to nest inside the raceway 222 and form a sliding clearance fit relationship with raceway 220 such that arcuate rail 222 is substantially freely slideable within raceway 220. As the inner C-frame 214 rotates relative to the outer C-frame 216, the arcuate rail 222 tracks or slides within the arcuate raceway 220, and as an end of the arcuate rail 222 approaches a respective end of the raceway 220, the inner C-frame 214 is prevented from rotating any further. For example, a rotation limiting arrangement may confine the arcuate rail 222 radially within the raceway 220 and the rotation limiting arrangement may include stop blocks at the ends of the raceway to prevent the arcuate rail 222 from further rotation once the arcuate rail 222 has met a stop block.

The position adjusting assembly 200 may include a hub position lock that includes a C-frame rotation locking system to lock the outer and inner C-frames 216, 214 relative to one another. The hub position lock may include an orbital locking system to lock the front orbital assembly 206 and rear orbital assembly 208 relative to one another. The C-frame rotation locking system and/or orbital locking system may be any suitable and readily providable locking arrangement or system including a clamping arrangement, a cam lock arrangement, or any other desired locking arrangement.

For example, an exemplary C-frame rotation locking system may include an arrangement of dowel holes formed through the inner and outer C-frames 214 and 216. The dowel holes in the inner C-frame 214 are alignable with corresponding dowel holes in the outer C-frame 216. When aligned with one another, corresponding dowel holes in the inner C-frame 214 and outer C-frame 216 are accessible to receive a dowel pin to lock the C-frames 214, 216 relative to each other. Each dowel pin may include a cam locking/clamping arrangement to impart a clamping/locking force between adjacent portions of the C-frames 214, 216. When a user desires to adjust the relative positions of the C-frames 216 and 214, the dowels may be released and removed from it respective dowel holes and the C-frames may be rotated to the desired position, and the dowels then reinserted through corresponding aligned dowel holes in the C-frames. Optionally, when a user desires to separate the front portion of the vehicle 100 from the rear portion, the dowels may be released and removed from respective dowel holes and the front and rear portions of the vehicle 100 may then be slid or pulled apart from one another. It will be appreciated that other examples of potential hub locking systems may be provided, such as spring-loaded clamps that are normally biased into a locked position, for example.

In some embodiments, the C-frame rotation locking system and orbital locking system of the hub position lock may be releasable on-the-fly such that a rider may adjust the relative position of the C-frames 216 and 214 or the orbital assemblies 206 and 208 while riding and operating the vehicle 100. For example, a position actuator such as a controllable lead screw, or hydraulic or pneumatic cylinder may be provided between the C-frames 216 and 214 to permit a rider to adjust the relative position of the C-frames while riding the vehicle 100. A controller for the position actuator may be provided at the handlebar 306 such that a rider may control the position actuator without removing their hands from the handlebar.

The outer C-frame 216 includes an upper support portion 224 to connect the seat support 114, handlebar support 116, and shock absorber 148 to couple to hub 112 (FIGS. 2, 4, 5, and 7A-7B). The shock absorber 148 is pivotally coupled to a forward portion of C-frame upper support portion 224 at pivot point 150. Seat support 114 and handlebar support 116 are each selectively, moveably coupled to C-frame upper support portion 224. As best illustrated in FIGS. 4 and 5, the C-frame upper support portion 224 includes a slot or raceway 226 defined by a channel formed along the upper edge of the upper support portion. Seat support 114 and handlebar support 116 are each moveably connected with raceway 226. Seat support 114 and handlebar support 116 are moveable independent of one another such that the seat 202 and handlebar 306 may be adjusted to desired positions relative to one another and relative to the main vehicle body 106. The seat support 114 and/or handlebar support 116 may be releasable on-the-fly such that a rider may adjust the arrangement's position relative to the C-frame upper support portion 224 and main vehicle body 106 while riding and operating the vehicle 100.

In the illustrated embodiment in which the seat support 114 of vehicle 100 is coupled to the C-frame upper support portion 224, the seat 202 remains in-line or parallel to the center line of the telescopic shock absorber 130 regardless of the configuration of the orbital steering assembly 204. In other words, if the vehicle 100 is turned such that the front orbital assembly 206 is not co-planar with the rear orbital assembly 208, the seat 202 remains in-line and coplanar with the front orbital assembly 206 and is thus not coplanar with the rear orbital assembly 208. However, this is not a requirement. Instead, as would be understood by one skilled in the art, embodiments are contemplated in which the seat 202 and seat support 114 remain in-line or parallel to the center line of the rear orbital assembly 208 and the rear wheel 120 regardless of the configuration of the orbital steering assembly 204. Further embodiments are contemplated in which the seat 202 and/or seat support 114 move or pivot independent of the orbital steering assembly 204.

Referring now to FIGS. 6-10, handlebar support 116 of vehicle 100 includes a handlebar articulated linkage 314 pivotally connected to a slidable support arm 316 at pivot point 318 to allow the height of handlebar 306 to be adjusted. Pivot point 318 may include a locking arrangement for locking the position of articulated linkage 314 relative to slidable support arm 316. For example, an adjustable type articulating clamp may be provided to lock the relative positions of articulated linkage 314 and slidable support arm 316. Slideable support arm 316 is slideably connected to raceway 226 of C-frame upper support portion 224. Articulated linkage 314 includes a first link 320 and a second link 322 that are pivotally connected at pivot point 324. The handlebar 306 is pivotally connected to the distal end of the second link 322 of articulated linkage 314 such that the handlebar is pivotable about a handlebar pivot axis 308 (FIGS. 1 and 6).

A biasing and dampening arrangement may be provided between the first link 320 and second link 322 of articulated linkage 314 to provide a suspension or shock absorbing function for the handlebar support 116. The biasing and dampening arrangement may provide for the adjustment in the orientation of the handlebar support 116 as illustrated sequentially between FIGS. 7A and 7B. For example, the biasing and dampening arrangement may include an extendable and retractable actuator (e.g. a pneumatic or hydraulic actuation cylinder) that retains the handlebar support 116 in a desired position until a rider applies an adjusting force to the handlebar support 116 at which time the extendable actuator releases partially to enable movement of the handlebar support. Once the desired position of the handlebar support 116 is reached and the rider stops applying the adjusting force, the actuator retains the handlebar support in the desired position while providing shock absorption functionality. While the adjustability of the handlebar support 116 is described in terms of an extendable and retractable actuator, this is not a required arrangement. It will be appreciated that other adjustment systems or devices may be provided to permit the handlebar support 116 to move relative to the main vehicle body 106 and also secure the support 116 in a desired orientation. For example, an adjustable articulating clamp may be provided between the articulating linkage 318 and the support base 316 at pivot point 318.

The handlebar articulated linkage 314 and the cable steering system 300 cooperate with one another to provide for controlling and steering the front wheel 118 about the first steering axis 154 and the second steering axis 156. As mentioned above and as best shown in FIGS. 6-7B, the cable steering system 300 includes a first axis control system 302 with a first plurality of pulleys 310, a second plurality of pulleys 311, and an endless loop cable 312 routed along the pulleys 310 and 311. The first plurality of pulleys 310 include pulleys 310*a*, 310*b*, 310*c*, 310*d* and 310*e* (FIGS. 6 and 6A) which are attached in spaced arrangement along each side (FIGS. 8 and 10) of the handlebar support 116 and articulated linkage 314. The second plurality of pulleys 311 include a set of pulleys 311 attached on each side of the outer C-frame 216 of the front orbital assembly 206 of hub 112. The first axis control system 302 includes a universal joint 326 coupled at one end to the inner steer tube 138 at the first end 134 of the steering tube assembly 135. The universal joint 326 permits the cable steering system 300 to rotate the inner steer tube 138 regardless of the position of the front suspension system 102 relative to the main vehicle body 106.

An input pulley 328 (FIGS. 8-10) is coupled with the handlebar 306 and an output pulley 330 (FIGS. 3A-3B, and 5-6) is coupled to the opposite end of the universal joint 326. Preferably, the input and output pulleys 328 and 330 are coupled with or secured/fixed to the cable 312 in such a manner that the cable 312 is substantially always engaged with the pulleys 328 and 330 such that the cable 312 does not slip or slide over the pulleys 328, 330. The endless loop cable 312 is routed along an endless cable path that follows the first pulleys 310 along the right side of the handlebar support 116, to the second pulleys 311 along the right side of outer C-frame 216, around the output pulley 330, then along the second pulleys 311 on the left side of the outer C-frame 216, to the first pulleys 310 along the left side of the handlebar support 116, and around the input pulley 328 where it finally meets first pulleys on the right side of the handlebar support 116 to form an endless loop path. The input pulley 328 is co-axial with the handlebar axis 308 such that the pulley 328 rotates around axis 308 as the handlebar 306 is turned. Accordingly, as the handlebar 306 is turned the cable 312 rotates the output pulley 330 and the universal joint 326 which in turn rotates the inner steer tube 138 about the first steering axis 154 to turn the front wheel 118.

A pair of handlebar retaining pulleys 332 (FIGS. 8-10) are attached to the handlebar support 116 proximate the input pulley 328 and are positioned such that the pulleys 332 guide the cable toward the input pulley 328 and retain the cable 312 around input pulley 328. A pair of C-frame retaining pulleys 334 (FIGS. 3A-6) are attached to outer C-frame 216 proximate the output pulley 330 and are positioned such that the pulleys 334 guide the cable 312 toward the output pulley 330 and retain the cable 312 around output pulley 330. The arrangement of the pulleys (310, 311, 328, 330, 332, and 334) of cable steering system 300 enables the cable 312 to remain under tension at generally all times (i.e. does not permit excessive slack in the cable 312) such that the control of the vehicle 100 is responsive, intuitive, and safe. This generally remains the case regardless of the orientation of the handlebar 306, the articulating linkage 314, the hub 112, or the front suspension system 102. For example, in one contemplated embodiment the axis of pulley 330 may be slightly offset relative to the steering tube rotation axis 132. In this manner, the pulley 330 is positioned such that as the steering tube assembly 135 articulates or pivots relative to the main vehicle body 106, this axial offset permits the pulley 330 to take up slack or play in the cable 312 due to unwrapping or loosening of tension in the cable 312 which may occur when the front suspension system 102 articulates. With pulley 330 offset relative to the steering tube axis 132, the front suspension pivot point 131 may be positioned lower than the steering tube axis 132, which positions the steer tube assembly 135 in a near horizontal position that permits optimum turning performance of the vehicle 100. In this manner, with a near horizontal orientation of the steering tube axis 132, the wheelbase of vehicle 100 does not elongate a significant amount when the front suspension system 102 articulates upward, thus providing for consistent rider feedback and control when riding the vehicle 100. While the pulley 330 is described in the illustrated embodiment as being offset from the steering tube axis 132, this is not a requirement. It will be appreciated that the pulley 330 may be aligned co-axially with the steering tube axis 132 while still providing for movement and pivoting of the front suspension system 102 without substantially affecting the operation of the cable steering system 300.

Figure 6A:
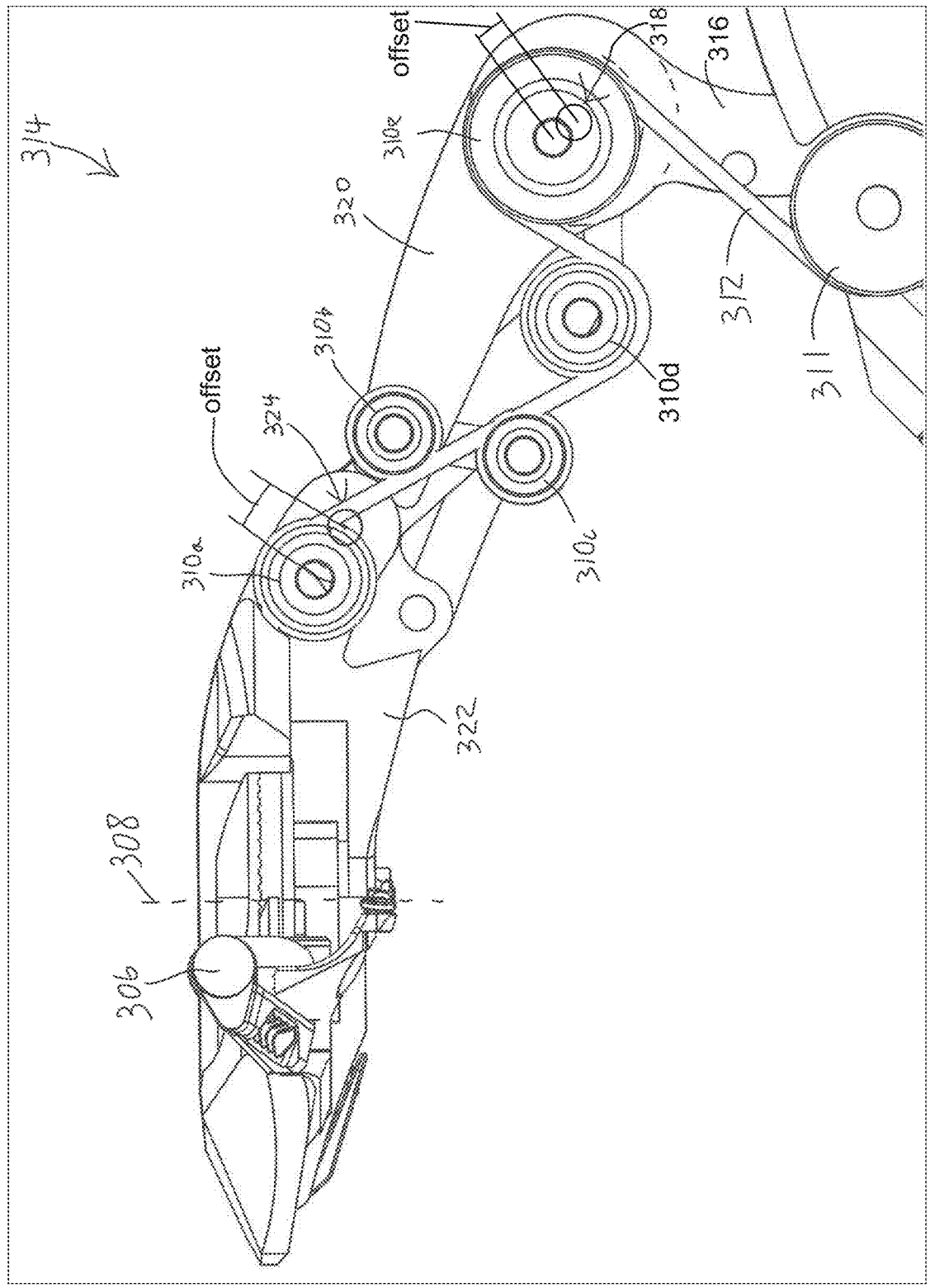
FIG. 6A is an enlarged view of the region designated 6A in FIG. 6.
Figure 10:
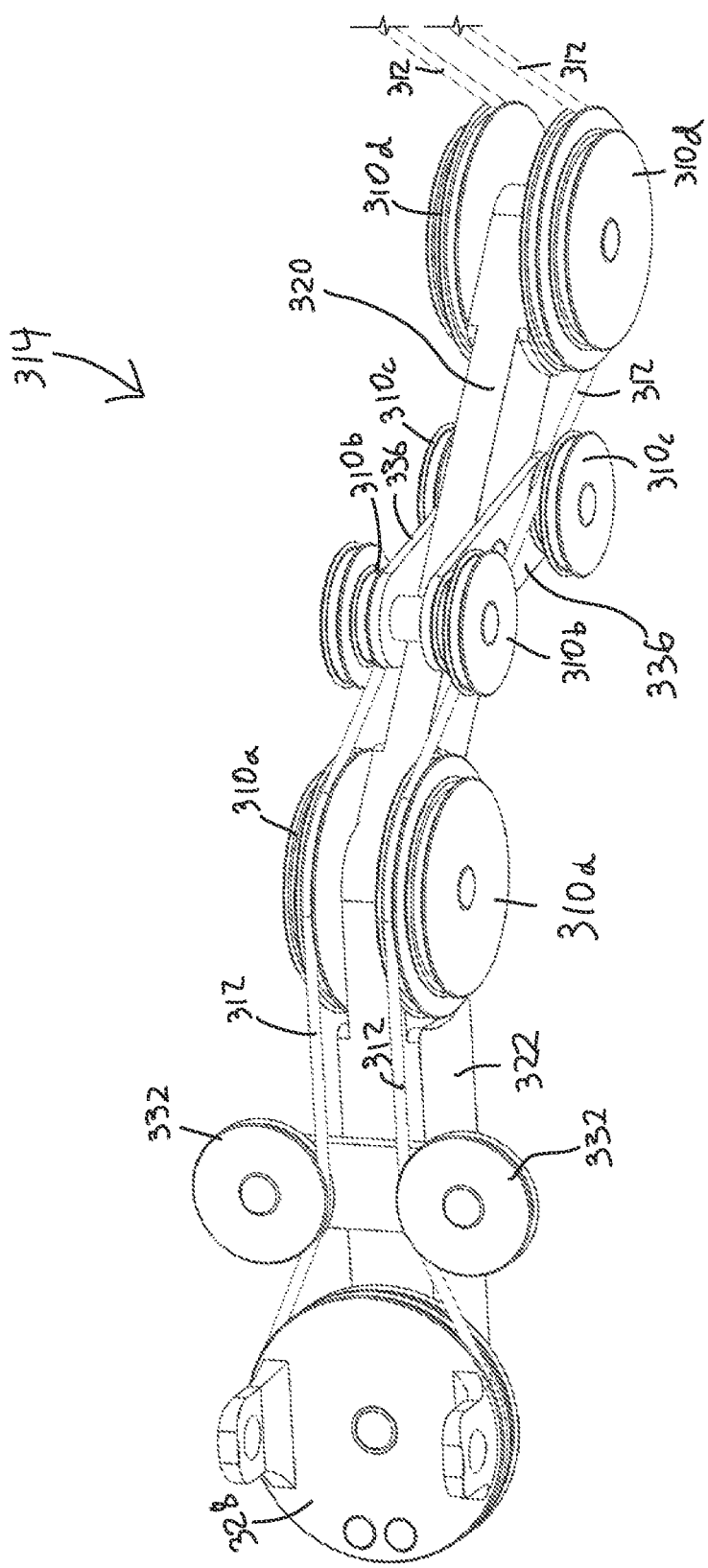
FIG. 10 is a top-side perspective view of a cable and pulley assembly for the cable steering assembly and a portion of an articulated linkage of the handlebar support of FIG. 8.

As best shown in FIG. 6A, the positioning of the axial center of pulleys 310*a* and 310*c* are offset relative to axial centers of respective adjacent articulated linkage pivot points 324 and 318. The offset of pulleys 310*a* and 310*e* is configured such that the pulleys take up slack from the cable 312 as the articulated linkage 314 moves relative to the main vehicle body 106. Without the pulley offset, the cable 312 may unwrap or disengage from the pulleys of the cable steering system 300 when the articulated linkage 314 moves upward and downward (FIGS. 7A-7B). The offset pulley arrangement cooperates with a cable tensioning assembly or cable tensioner 336 that is coupled to the articulated linkage (FIGS. 6 and 10). The cable tensioner 336 will be described in more detail below. While the pulleys 310*a* and 310*e* are described in the illustrated embodiment as being offset from respective axes of linkage pivot points 324 and 318, this is not a requirement. It will be appreciated that the pulleys of the cable steering system which function similar to pulleys 310*a* and 310*e* may be aligned co-axially with pivot points of the articulated linkage 314 while still providing for actuation of the linkage 314 without substantially affecting the operation of the cable steering system 300.

The cable tensioner 336 forms a portion of articulated linkage 314 and is pivotably coupled to a portion of the linkage assembly. Pulleys 310*b* and 310*c* are positioned at respective ends of the cable tensioner 336 and are position on opposite sides off the cable 312. The cable tensioner 336 may include a biasing device, such as a spring or hydraulic cylinder, to automatically urge the pulleys 310*b* and 310*c* toward the cable 312 to increase or relieve the tension in the cable as the linkage 314 actuates.

Figure 12:
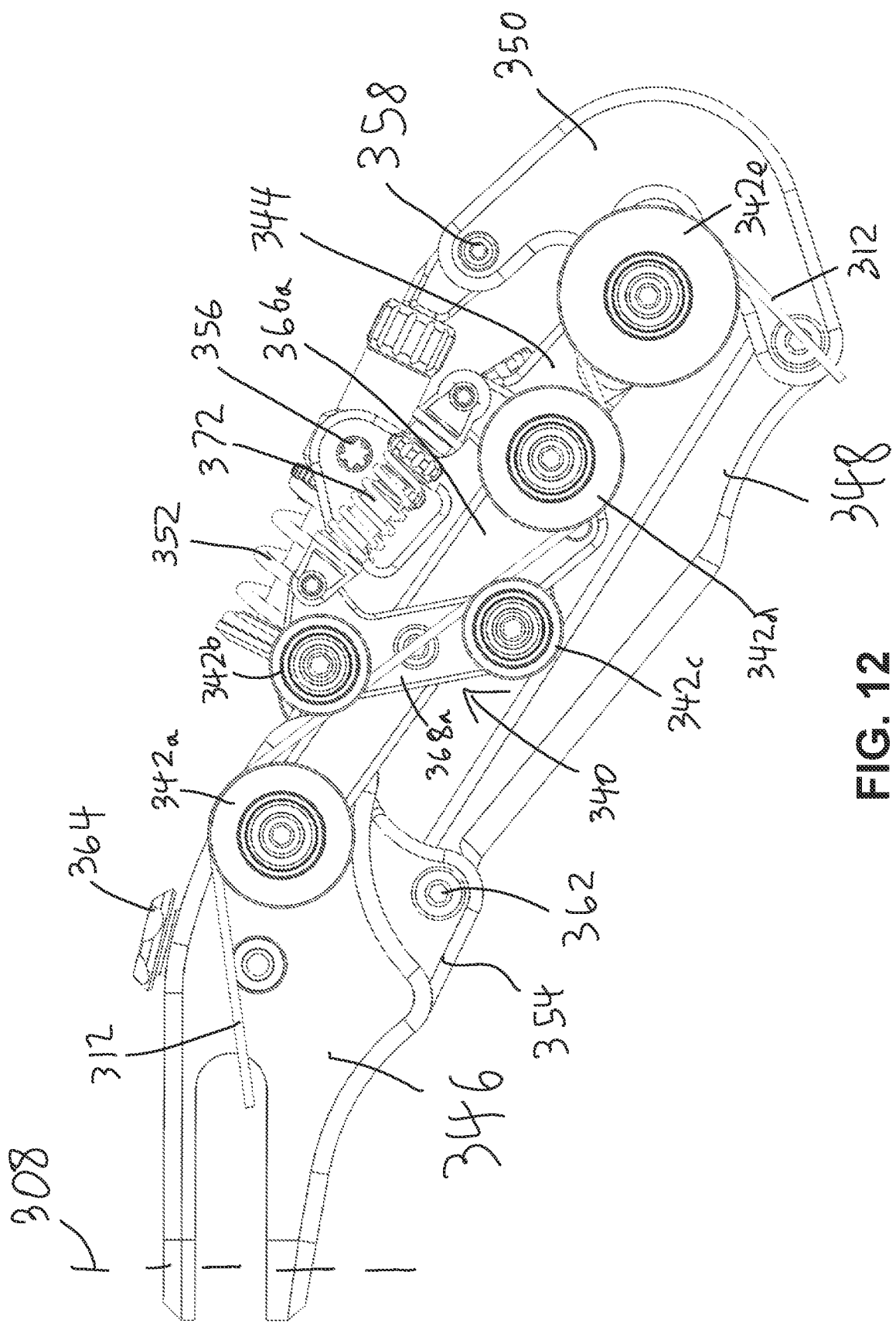
FIG. 12 is a left-side view of the handlebar support and cable steering system of FIG. 11.
Figure 13:
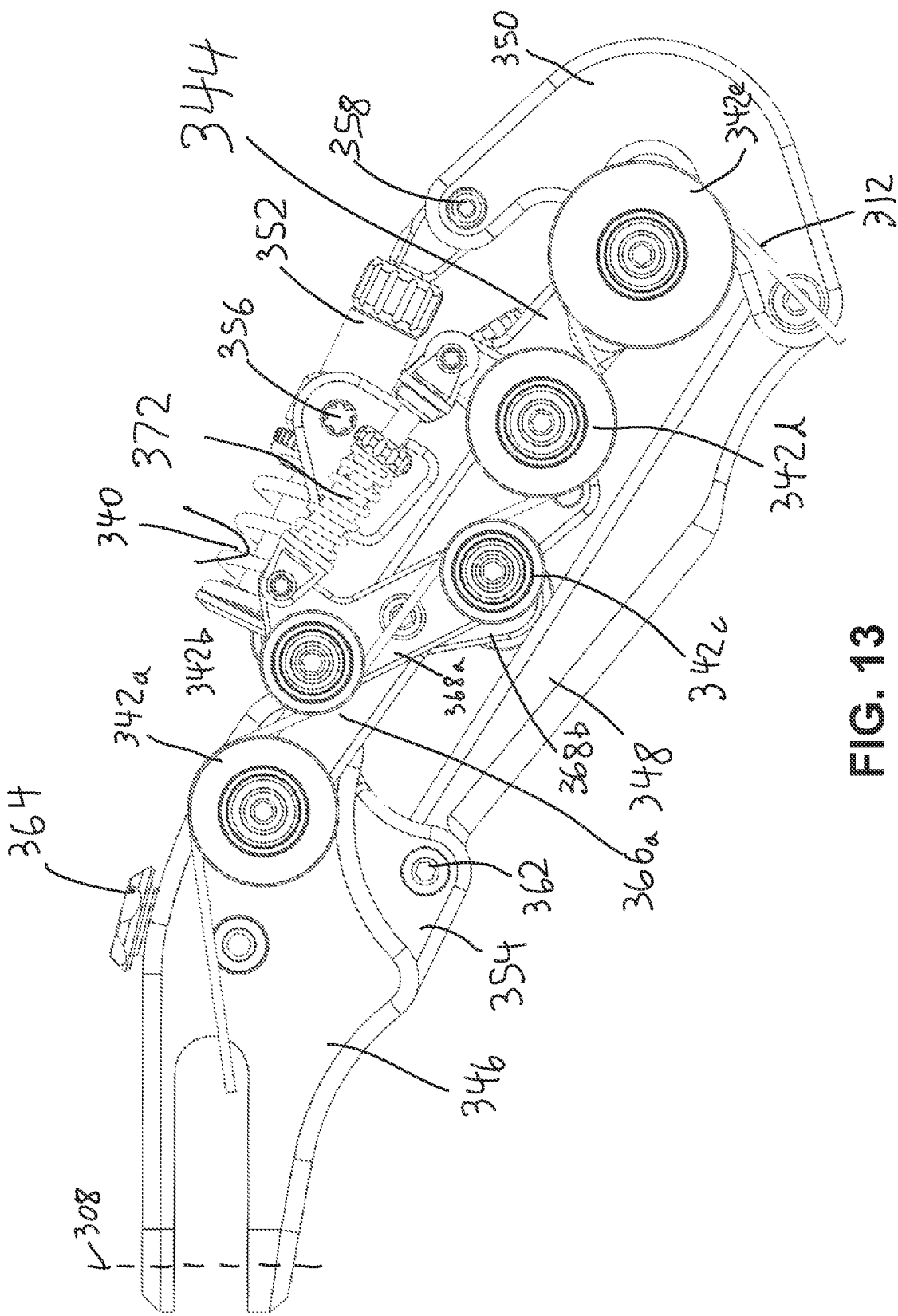
FIG. 13 is another left-side view of the handlebar support and cable steering system of FIG. 11, depicting a cable tension lever engaging the cable.
Figure 14:
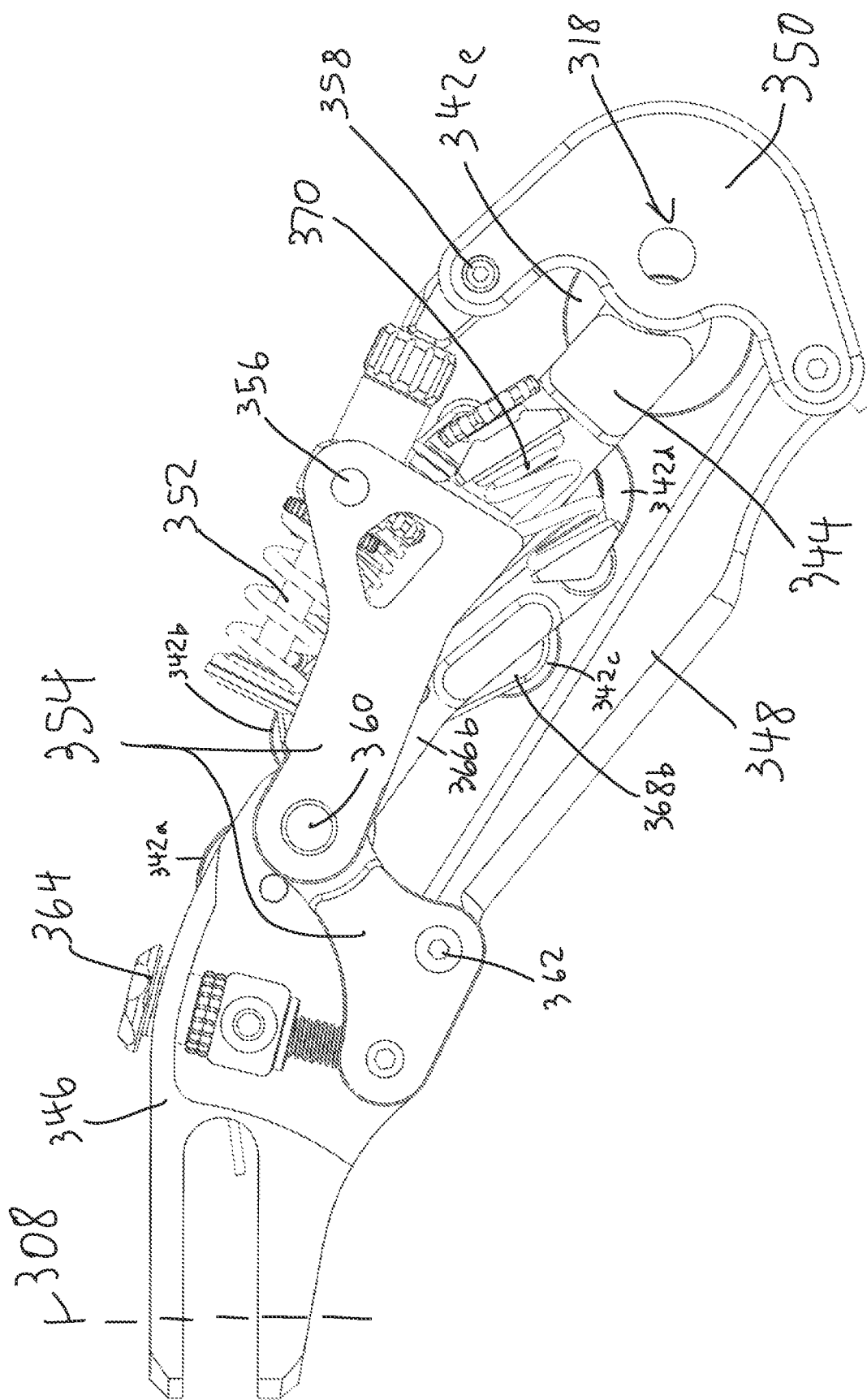
FIG. 14 is a sectional view of the handlebar support and cable steering system of FIG. 11 taken along the longitudinal center line of the support and system.

Another example of a handlebar articulated linkage 338 is provided in the illustrated embodiment of FIGS. 11-14. The handlebar articulated linkage 338 includes a cable tensioner 340 which functions similar to cable tensioner 336. Similar to articulated linkage 314, the articulated linkage 338 also includes a set of pulleys 342a, 342b, 342c, 342d, and 342e (FIGS. 11-13) which are substantially identical in arrangement and function to pulleys 310 of linkage 314. The articulated linkage 338 is formed by an assembly of links including a first link 344 (FIGS. 12-14), a second link 346, a third link 348, and a fourth link 350 (FIGS. 11-14). The articulated linkage 338 is coupled to the support base 316 via the fourth link 350 at pivot point 318 (FIGS. 6-7B and 14). A biasing and dampening device, in the form of a spring shock absorber 352, is pivotably attached between the fourth link 350 and an actuation adjustment linkage assembly 354 at respective pivot points 356 and 358 (FIG. 14). Handlebar articulated linkage 338 with the shock absorber 316 absorbs and reduces shock and vibration experienced by a rider at the handlebar 306. The actuation adjustment linkage 354 is pivotably coupled to the second link 346 at a first actuation pivot point 360 and also pivotably coupled to the third link 348 at a second actuation pivot point 362 (FIG. 14).

An actuation control, in the form of a screw adjuster 364, is coupled between the second link 346 and the adjustment linkage 354 and is provided for controlling the orientation and/or shock absorption characteristics of the articulated linkage 338. Whereby adjusting the screw adjuster 364 changes the spring force applied between second link 346 and the fourth link 350 which may adjust the angle between the first link 344 and the second link 346 and may change the softness or firmness of shock absorption of the articulated linkage 338. Adjusting the screw adjuster 364 also changes the amount of line tension in cable 312 for the overall cable steering system 300, which may permit the rider to fine tune a desired level of sensitivity and responsiveness of the cable steering system 300.

The cable tensioner 340 includes a pair of primary tensioning arms 366a and 366b disposed on respective sides of the articulated linkage 338 and a pair of secondary tensioning pivot arms 368a and 368b disposed on respective ones of the primary tensioning arms 366a and 366b and pivotably coupled at their middle portions to their corresponding primary tensioning arm. Pulleys 342a and 342d are coupled to opposite ends of corresponding primary tensioning arms 366a, 366b. A biasing device, in the form of an adjustable spring shock absorber 370, is connected between the primary tensioning arms 366a, 366b and a portion of the first link 344 (FIG. 14). The shock absorber 370 pushes against the primary tensioning arms 366a, 366b in such a manner as to bias the pulleys 342a and 342d into contact with the cable 312. The shock absorber 370 is operable to bias each of the primary tensioning arms independently such that the arms 366a and 366b may move independent of one another.

Figure 11:
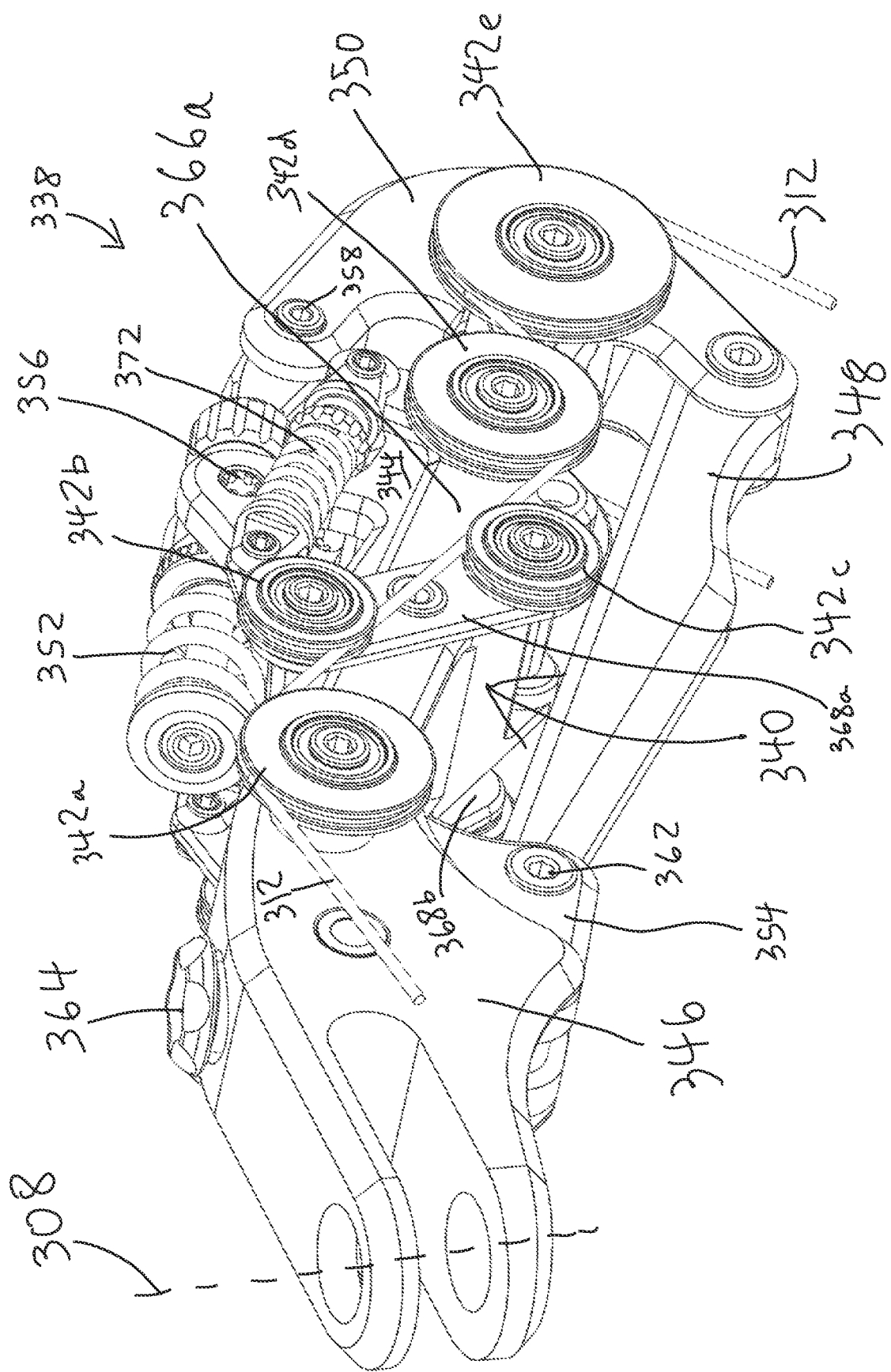
FIG. 11 is a front-side perspective view of another handlebar support and cable steering system for a motorcycle, in accordance with aspects of the present invention.

Pulleys 342b and 342c are coupled to opposite ends of corresponding secondary tensioning arms 368a, 368b (FIGS. 11-13). A biasing device, in the form of a spring shock absorber 372, is provided with each secondary tensioning arm 368a, 368b and connected between the secondary tensioning arm 368 and a portion of the corresponding primary tensioning arm 366a, 366b (FIGS. 11-13). The shock absorber 372 pushes against the secondary tensioning arm in such a manner as to bias the pulleys 342b and 342c into contact with the cable 312. The cable tensioner 340 maintains the cable 312 under substantially constant tension regardless of the orientation of the articulated linkage or front suspension system 102 as well as under extreme or unanticipated impact events experienced by the vehicle 100. Under typical or normal riding conditions, the primary tensioning arms 366a, 366b are adequate to maintain the cable 312 under constant tension. However, under extreme or extraordinary riding conditions, the cable 312 may become overloaded, either symmetrically (i.e. the portions of cable on each side of articulated linkage 338 are overloaded equally) or asymmetrically (i.e. the cable on only one side of articulated linkage 338 is overloaded while the tension on the other side is either unchanged or decreased). The biasing and dampening devices of articulated linkage 338, including shock absorbers 352, 370, and 372, may each include one or more adjustment features, such as actuation limiters to set the maximum limits of the actuation of the articulated linkage 338 and its various components and actuation directions and/or pre-load adjusters to adjust the standard or baseline spring force of the shock absorber, for example.

Because there are primary tensioning arms 366a, 366b and secondary cable tensioning arms 368a, 368b on respective sides of the articulated linkage 338, the cable 312 may be maintained under substantially constant tension when the vehicle 100 is turned in either direction, particularly during overload scenarios. The primary tensioning arms 366a, 366b and/or secondary tensioning arms 368a, 368b may operate in cooperation with one another such as when the front suspension system 102 articulates to absorb an impact when the vehicle 100 is driving in the normal straight-ahead direction of travel. Further, the primary tensioning arms 366a, 366b and/or secondary tensioning arms 368 may operate independent of one another in the event that the cable 312 is overloaded on only one side of the articulated linkage 338 such as during a hard turn of the vehicle 100. Optionally, in some contemplated embodiments, the primary tensioning arms 366a and 366b may be coupled to one another such that they move in sync with one another at all times.

For one example, as illustrated in FIG. 12, the primary tensioning arms 366a, 366b and secondary tensioning arms 368a. 368b are aligned with one another and the portion of the cable 312 routed between pulleys 342a, 342b, 342c, and 342d one each side of articulated linkage 338 is in a generally straight path, indicating that the cable 312 is in an initial or standard operating position and is not under an increased or decreased load. Accordingly, the primary cable tensioning arms 366a and 366b are providing a majority or all of the cable tensioning function and the secondary tensioning arms 368a, 368b are substantially passive or only minimally engaged such that pulleys 342b and 342c are only minimally in contact with the cable 312.

For another example, as illustrated in FIG. 13, the secondary tensioning arm 368a on the left side of articulated linkage 338 is not aligned with the secondary tensioning arm 368b on the right side of the linkage. In this example, the vehicle 100 may be experiencing a steering force overload, such as in the event a rider attempts to steer out of difficult terrain which requires substantial steering force input. As the rider applies increased force to the handlebar to turn the front wheel 118, the portion of cable 312 on one side of the linkage (e.g. the side of the linkage opposite of the direction of the turn) experiences increased tension and the portion of cable 312 on the other side of the linkage (e.g. the side of the linkage corresponding to the direction of the turn) experiences decreased tension. In the illustrated example, the portion of cable 312 on the right side of the articulated linkage is experiencing an increased load and the portion of cable 312 on the left side is experiencing a decreased load. As such, the portion of cable 312 on the left side begins to go slack due to the decreased load. Accordingly, the primary cable tensioning arm 366a becomes under-loaded and is unable to maintain tension on the cable 312. Thus, the biasing shock absorber 372 biases the second tensioning arm 368a toward the now slacked cable 312 and the pulleys 342b and 342c apply a tensioning force to the cable 312 to effectively take up the slack and maintain the cable 312 under generally constant tension. Notably, in this scenario and as illustrated in FIG. 13, the secondary tensioning arm 368b on the right side is not required to impart any tensioning force on the cable 312 as the primary tensioning arm 366b experiences the overloading of the portion of cable 312 on the right side of the articulated linkage 338. In other words, the cable path on the right side of the articulated linkage 338 shortens as the right side primary cable tensioning arm 366b moves under the force applied by pulley 342a and 342d in order to accommodate or relieve the overloading in the cable 312. Since the cable path on the ride side shortens, the cable path on the left side must lengthen in order to take up the slack in the cable on the left side of the articulated linkage 338. The secondary tensioning arm 368a provides the function of lengthening the cable path of the left side in this scenario as it redirects the cable from its standard straight operating position into a zig-zag or non-straight position, as shown in FIG. 13. The secondary tensioning arms 368a and 368b are preferably only engaged when the vehicle 100 experiences extreme or atypical operating conditions.

It is contemplated that either of the input pulley 328 or the output pulley 330 may have a selectively expandable and collapsible diameter that may be increased or decreased by the rider via an adjustment control, such as dial, disposed on the handlebar 306 or the handlebar support 116. The expandable and collapsible diameter pulley permits the rider to adjust the steering sensitivity between the rotation of the handlebar 306 and the corresponding rotation of the inner steer tube 138.

Referring to the illustrative embodiment of FIGS. 15 and 16, the input pulley 328 of cable steering system 300 may include a cable routing and clamping system 374. The cable system 374 effectively creates an endless loop for cable 312 by fixedly securing the ends of the cable 312 to the input pulley 328. The cable system 374 includes a plurality of cable routing spools and cable securing clamps, including cable entry spools 376, cable entry spool clamps 378, wrapped cable wedge clamps 380, and cable end clamps 382. FIG. 16 illustrates the routing of respective ends of the cable 312 as it is routed in the cable system 374, however the input pulley 328 is omitted for illustrative purposes. While the cable routing and clamping system 374 is described in combination with the input pulley 328, it will be appreciated that the cable routing and clamping system 374 may be disposed in the output pulley 330 instead of the input pulley or the system 374 may be provided in each of the input and the output pulleys 328 and 330.

The cable steering system 300 includes a second steering axis steering assembly or actuator 304 coupled between the steering tube assembly 135 and the hub 112. The actuator 304 includes a steering actuation linkage 228 which forms a portion of or operates in connection with the orbital steering assembly 204 to automatically pivot the orbital assemblies 206, 208 relative to one another about the second steering axis 156 whenever the steerable front suspended assembly 108 rotates about the first steering axis 154 (FIGS. 4-5 and 17-19). The steering linkage 228 includes a linkage assembly having a first link 230 (FIGS. 4-5 and 17-19) fixedly attached at a forward, proximal end 230a to the first end 134 of the inner steer tube 138 and/or the universal joint 326. The linkage assembly includes a second link 232 (FIGS. 2, 4-5, and 17-19) that is fixedly attached at a rearward, proximal end 232a to a portion of the rear orbital assembly 208 and pivotally coupled at a forward, distal end 232b to the rearward distal end 230b of first link 230 (FIGS. 4 and 17-19). The steering linkage 228 operates such that when the first axis control system 302 causes the inner steer tube 138 to rotate about the first steering axis 154, the first link 230 is automatically rotated along with the inner steer tube 138 and the first link 230 urges the second link 232 to move, thereby causing the rear orbital assembly 208 to pivot about the second steering axis 156 relative to the front orbital assembly 206.

Figure 19:
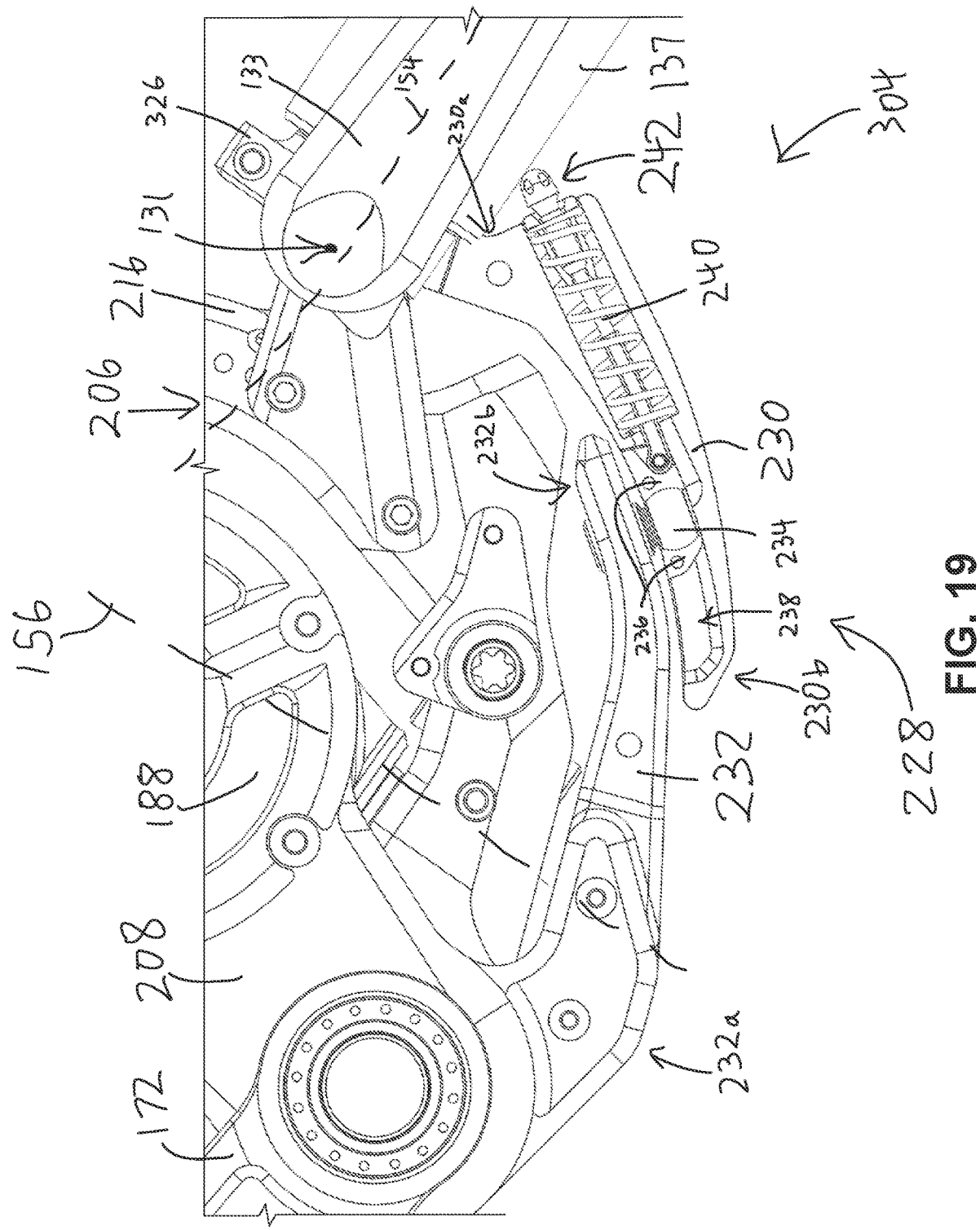
FIG. 19 is a sectional side view of the steering actuation linkage assembly of FIG. 17, the section taken about the longitudinal center line of the motorcycle.

A ball joint 234 is disposed between the first link 230 and the second link 232 to transmit force between the links 230 and 232 (FIG. 19). The ball joint 234 is fixedly attached at one end to the distal end 232b of the second link 232. The opposite end of the ball joint 234 is pivotably and slideably coupled to the first link 230. The pivotable ball of ball joint 234 is pivotably disposed in a slideable bracket 236 (FIG. 19). The slideable bracket or follower 236 is slideably disposed in a guide track or raceway 238 (FIGS. 18 and 19) that is formed in an upper portion of the first link 230 near its distal end 230b. The follower 236 is substantially freely slideable within raceway 238. When the orbital steering assembly is in non-turned, planar orientation, as illustrated in FIG. 17, the follower 236 and ball joint 234 are positioned at the forward end of raceway 238 as shown in FIG. 19). When the orbital steering assembly is turning, the follower 236 slides rearwardly along the raceway 238 as the first and second links 230 and 232 pivot relative to one another about the ball joint 234. When the follower 236 reaches or contacts the rearward end of the raceway 238 at the distal end of first link 230, the front and rear orbital assemblies 206 and 208 of orbital steering assembly 204 are limited from pivoting any further relative to one another and are therefore at their maximum permitted turned, non-planar orientation. Thus, the steering linkage 228 provides a system for automatically articulating the orbital steering assembly 204 to rotate about the second steering axis 156 whenever the inner steer tube 138 rotates about the first steering axis 154 and further provides a pivot/rotation limiter for the orbital steering assembly 204. It will be appreciated that the turning/rotation ratio or relative rotation rate between the first steering axis 154 and the second steering axis 156 may be adjusted or modified by adjusting the length of links 230 and 232, adjusting the position of the ball joint 234 between the links 230, 232, or adjusting the connection points of links 230 and 232 with respective portions of the front and rear portions of the vehicle 100.

A biasing and dampening device, in the form of a spring type pull shock 240, is disposed internally within the first link 230 and is coupled to the follower 236 (FIG. 19). The pull shock 240 biases (i.e. pulls) the follower 236 and ball joint 234 toward the proximal end 230a of the first link 230 in order to assist in returning the orbital steering assembly 204 from a turned, non-planar orientation (FIG. 18) to its non-turned, planar orientation (FIG. 17). The pull shock 240 includes a pre-load adjuster 242 to adjust the standard or baseline spring force of the pull shock (FIG. 19) to permit a rider to adjust the level of biasing force provided between the first and second links 230 and 232. The pull shock 240 may also assist in retaining the follower 236 within the raceway 238. Additional securing devices or structures may also be provided to retain the follower 236 within the raceway 238, such as an interlocking rail and notch system provided along the raceway and follower. The interlocking rail and notch system permitting the follower to slide freely within the raceway without the ability to disengage from the first link 230. It will be appreciated that while the pull shock 240 biases the orbital steering assembly 204 toward its non-turned, planar orientation, the steering linkage 228 is configured such that it does not substantially impede or hinder the turning operation of the vehicle 100 about either of the steering axes 154 or 156.

Referring now to the illustrative embodiments of FIGS. 1-6 and 20-22, various embodiments of rider foot support systems or assemblies are provided for supporting the feet of a rider when they are operating the vehicle 100. In one exemplary embodiment, a reflexive or adjustable rider support system 400 is provided for supporting the feet of a rider during the operation of the vehicle 100 (FIGS. 1-6). Due to the adjustable nature of the vehicle, particularly the ability to adjust the hub 112 about the axis defined by pivot point 218 by rotating the C-frames 214 and 216 relative to one another, it is advantageous to provide an adjustable rider foot support that can be adjusted when the C-frames are rotated relative to one another. Accordingly, the rider support system 400 provides for adjustment of a rider foot support platform 402 when the C-frame 214 and 216 are rotated relative to one another.

The rider support system 400 is coupled to the front suspension system 102 at a portion of the steer tube housing 137 and at pivot point 131 between strut 133 and a strut 139 coupled to the outer C-frame 216 of the front orbital assembly 206 (FIGS. 3A-6). The foot support system includes rider foot support platforms 402 on each side of the vehicle's main body 106. The rider support system 400 includes a linkage assembly including a vertical or drop link 404 and a generally horizontal momentum/mass/force transfer link 406 that are pivotably coupled to one another at primary pivot point 408 (FIG. 4). The platforms 402 are also pivotally coupled to the assembly of the drop link 404 and transfer link 406 at pivot point 408 (FIGS. 3A-6).

The rider support system 400 includes an engagement or index ladder or board 410 that is coupled to a lower portion of the outer steer tube 137 (FIGS. 3A, 3B, 5, and 6). The engagement or index ladder 410 includes a set of index valleys or crevices 410a disposed along the lower surface of the ladder 410. The transfer link 406 has an indexing end 406a that is releasably receivable in the index valleys 410a (FIGS. 3A and 3B). Optionally, the indexing end 406a may be pivotably fixed within a particular valley 410a to secure the rider support system 400 during vehicle operation. In such an embodiment the indexing end 406a would be selectively releasable when the vehicle is not in operation such that the rider support system 400 may be adjusted when the hub 112 is adjusted via rotation of the C-frames 214, 216. Alternatively, the index valleys 410a may be configured with a slightly rearward opening orientation (as shown in FIGS. 1, 2, and 6) and the indexing end 406a enters a valley 410a by sliding upward and forward into the valley 410a. In this manner, based on the configuration of the links 404 and 406, when the rider is operating the vehicle and standing on the platforms 402, the rider's mass imparts a downward and partially forward force on the transfer link 406. This downward and partially forward force effectively locks the indexing end 406a into the rearwardly oriented index valley 410a. In this manner, the rider support system 400 may be adjustable on the fly while the rider is operating the vehicle 100 while also adjusting the hub 112 via rotation of the C-frames 214 and 216. For example, while moving along flat, even ground, the rider may drag rearward with their feet along the foot platforms in order to pull the transfer link 406 rearward and release the indexing end 406a from the rearwardly oriented valley 410a. Then, the rider may direct the transfer link 406 and indexing end 406a to a different index valley 410a by manipulating the foot platforms 402 with their feet.

The foot platforms 402 are coupled to one another by a coupling rod 412 that extends between the platforms 402 and through a hole 414 through the transfer link 406 (FIGS. 3A-3B). The hole 414 is larger than the coupling rod 412 to permit the coupling rod 412 to move up and down within the hole 414. As such, the foot platforms 402 are pivotable about pivot point 408 between an upward position as illustrated in FIG. 3A and a downward position as illustrated in FIG. 3B. In addition to providing for comfort adjustment of the foot platforms 402, the pivot actuation of the foot platforms 402 may provide a functional utility. For example, if the foot platform 402 is in the upward position (FIG. 3A) the rider's mass is transfer through pivot point 408 into the links 404 and 406. The force is transferred through the links 404 and 406 to pivot point 131 partially to the steer tube housing 137. However, when the foot platform 406 is in the downward position (FIG. 3B) a portion of the rider's mass is applied at a middle portion of the transfer link 406 instead of being concentrated at pivot point 408. With the rider's mass partially applied at the middle of the transfer link 406, a greater downward force from the rider's mass is transferred through the transfer link 406 to the steer tube housing 137. Thus, with foot platform 402 in the downward position, a greater portion of the rider's mass acts on the front suspension system 102 at a more forward position than when the platform 402 is in the upward position. A rider may take advantage of this forward force transfer, such as in situations where greater traction at the front wheel 118 is advantageous. While the foot platforms 402 are described herein as pivotable to allow the rider's mass to transfer into the second link, this is not a requirement. It will be appreciated that the foot platforms may be configured to maintain a generally horizontal orientation at all times and to transfer the rider's mass via pivot point 408.

In other operating situations, the rider support system 400 may be advantageous for improving the reaction time of the front suspension system 102 when the front wheel 118 encounters an obstacle. In other words, the rider support system 400 is operable to apply force to the steer tube housing 137 via the ladder 410 to assist in actuating the front suspension system 102. For example, in the event of the front wheel 118 impacting an obstacle, the forward momentum from the riders mass may be transferred via the foot platforms 402 through the transfer link 406 and into the steer tube housing 137. The force transferred from transfer link 406 to the steer tube housing 137 would be partially forward and partially upward. The upward component of the transferred force may act to actuate the front suspension 102 upward, and when combined with the upward force experienced by the front wheel 118 from impacting the obstacle, the front suspension 102 will articulate upward so the wheel can pass over the obstacle. The added upward force from the riders mass via the foot support system may cause the front suspension 102 to react more quickly to overcome the obstacle as compared to the impact force providing the only actuating force to the front suspension system 102. Overcoming obstacles in a shorter time creates less disruption to the forward momentum of the vehicle 100, therefore the rider support system 400 may improve the power use efficiency of the vehicle 100. A toe plate or toc stop 416 is provided at the forward end of the foot platform 402 (FIGS. 3a, 3B, and 5). The toe plate 416 retains the rider's foot on the platform 402 and also functions to transfer forward momentum from the rider's foot into the drop link 404 and transfer link 406 which may facilitate actuation of the front suspension system 102.

The orbital steering assembly 204 provides many advantages and may be configured to perform additional functions. For example, the foot support platforms 402 may be operably coupled with a portion of the orbital steering assembly 204 in order to provide some amount of steering input to control the overall direction of the vehicle 100. In one contemplated embodiment, the foot platforms 402 may be coupled with moveable rocker arms that would then engage a steering control lever system that steer the steerable wheel 118 about the first and/or second steering axes 154 and 156. Accordingly, the rider may selectively pivot the foot platforms to steer or assist in steering the overall direction of the vehicle. Such an embodiment may be beneficial for riders whom do not have the use, or have only partial use of either of their hands/arms.

In one such embodiment, a foot platform actuated steering system may be operable to steer the steerable wheel about the first steering axis 154. The foot platform actuated steering system may cooperate with a cable steering system to steer the wheel about the first steering axis 154 or the platform actuated steering system may perform some of the steering function about the first steering axis 154. Optionally, the foot platform actuated steering system may steer the steerable wheel about a third steering axis that is different that the first and second steering axes 154, 156. It is contemplated that the handlebar may be utilized to steer the steerable wheel about the first steering axis 154 and a foot platform actuated steering system may be utilized to steer the steerable wheel about the second steering axis 156, and vice versa.

Figure 20:
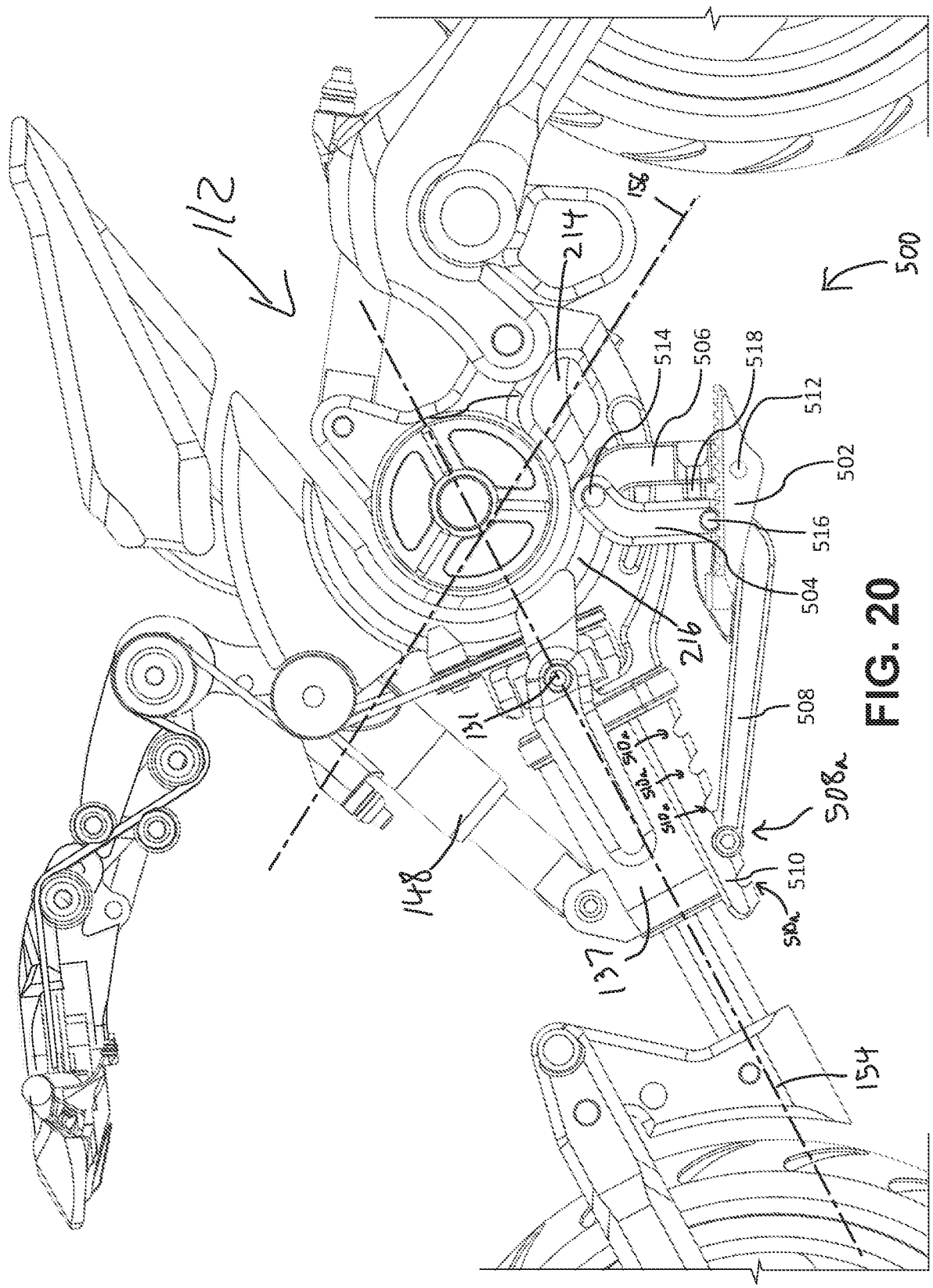
FIG. 20 is a partial side view of another motorcycle in accordance with aspects of the present invention.
Figure 21:
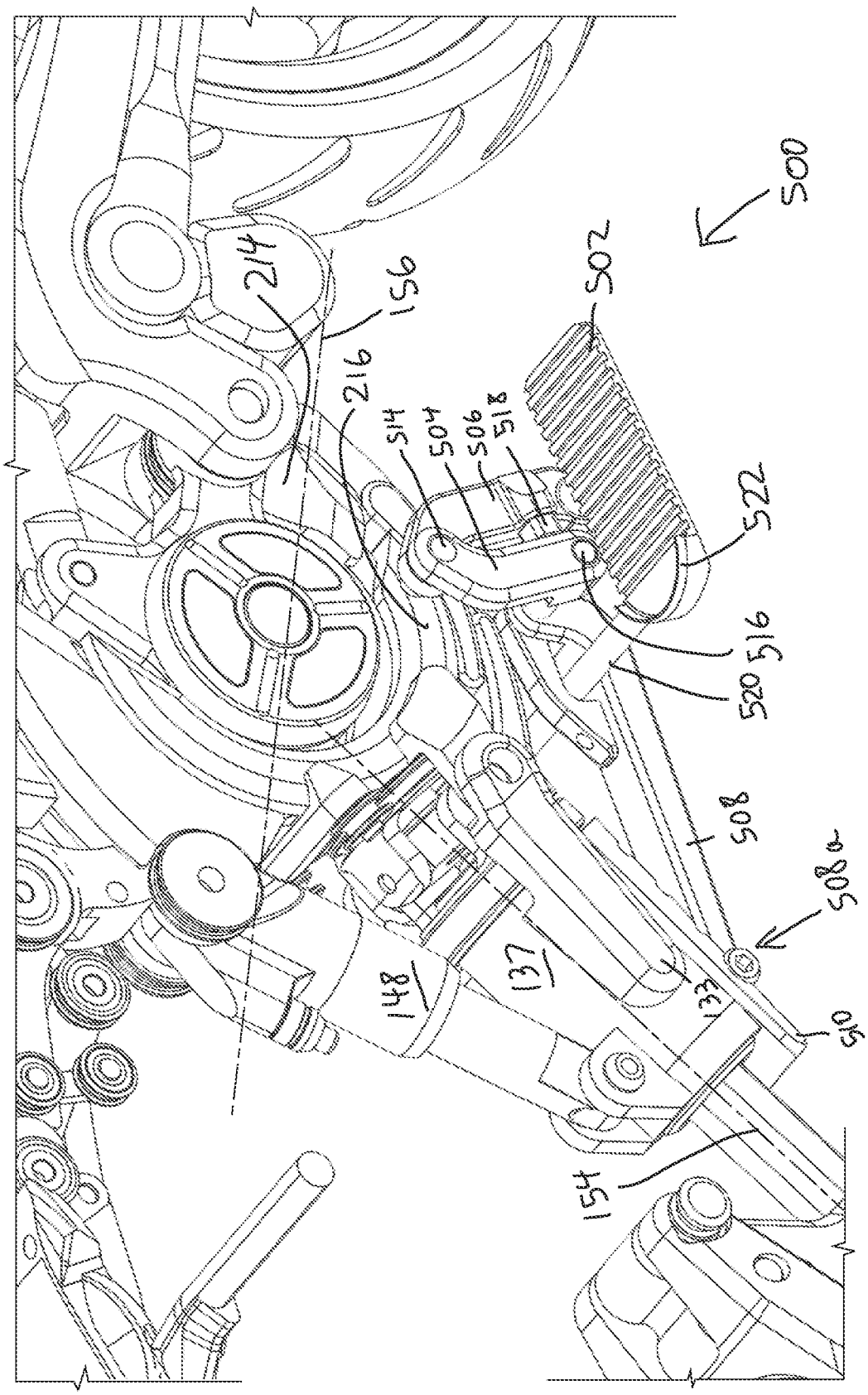
FIG. 21 is a top-side perspective view of a portion of a hub of the motorcycle of FIG. 20.

Another exemplary embodiment of a rider support system 500 is illustrated in FIGS. 20 and 21. The rider support system 500 is configured similarly and functions in similar fashion to rider support system 400 described above, and includes many identical or substantially similar components as noted below, with significant differences discussed in detail hereinafter. The rider support system 500 includes foot platforms 502, a forward drop/swing link 504, a rearward drop/push link 506, a generally horizontal momentum/mass/force transfer link 508 that includes an indexing end 508a and functions in similar fashion to transfer link 406 of system 400 as described above, and an index ladder 510 that includes index valleys and is substantially identical to ladder 410 of system 400 described above. The push link 506 and foot platform 502 are pivotably coupled to one another at a pivot point 512.

Unlike rider support system 400 of FIGS. 1-6, rider support system 500 is not pivotably coupled to a forward portion of the hub 112 (i.e. pivot point 131). Instead, rider support system 500 is pivotably coupled to a lower, middle portion of the hub 112 at a pivot point 514 at a lower portion of outer C-frame 216 of front orbital assembly 206 (FIGS. 20 and 21). The swing link 504 and push link 506 are each coupled to the hub 112 at pivot point 514. The swing link 504 and transfer link 508 are coupled to each other at pivot point 516. A push rod 518 (FIGS. 20 and 21) is coupled to the push link 506 and is positioned to contact and push the swing link 504 when the rider's momentum moves forward via the foot platforms 502. Similar to rider support system 400, support system 500 includes a platform connecting rod 520 that connects the two foot platforms 502 together. The connecting rod 520 passes through a hole formed in the transfer link 508. The foot platform 502 includes a toe plate 522 that functions substantially identical to toe plate 416 of rider support system 400 described above.

The rider's forward momentum is transfer from the foot platforms 502 through a pushing force that is applied to the swing link 504 by the push rod 518. As the rider's momentum moves forward relative to the vehicle 100 movement, the momentum is transfer from the foot platform 502 to the push link 506 which causes the push link to pivot forward. When the push link 506 moves forward, the push rod 518 imparts a pushing force to the swing link 504 which in turn swings or pivots the swing link forward. The rider's momentum and the forward movement of the swing link 504 are transferred to the transfer link 508 and then to the index ladder 510 and ultimately to the front suspension system 102. In similar fashion to the mass transfer described above in regard to rider support system 400, the rider's mass may also be transferred to the middle portion of the transfer link 508 and ultimately toward the front wheel 118. While the mechanism for transferring the rider momentum/mass from the foot platform 502 to the transfer link 508 of system 500 is different than the mechanism disclosed above for system 400, the overall function of the rider support system 500 is substantially identical to that described for system 400. For example, the forward and upward momentum/mass transfer provided through rider support system 500 may function to raise the front suspension system 102 and may also function to shift the rider's mass toward the front wheel 118 to improve front wheel traction.

Figure 22:
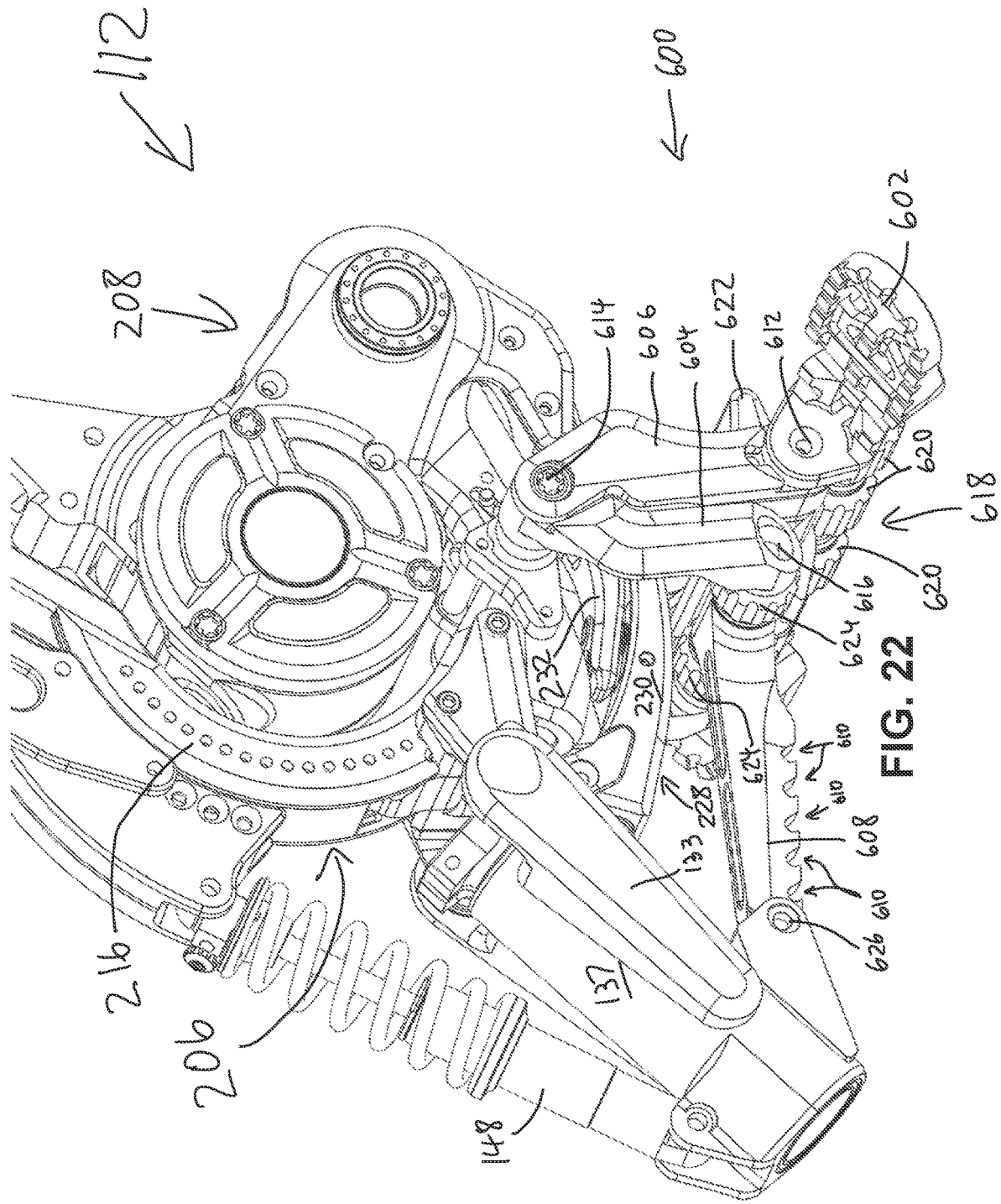
FIG. 22 is an enlarged front-left side perspective view of a portion of a hub of another motorcycle and another adjustable rider support system, in accordance with aspects of the present invention.
Figure 23:
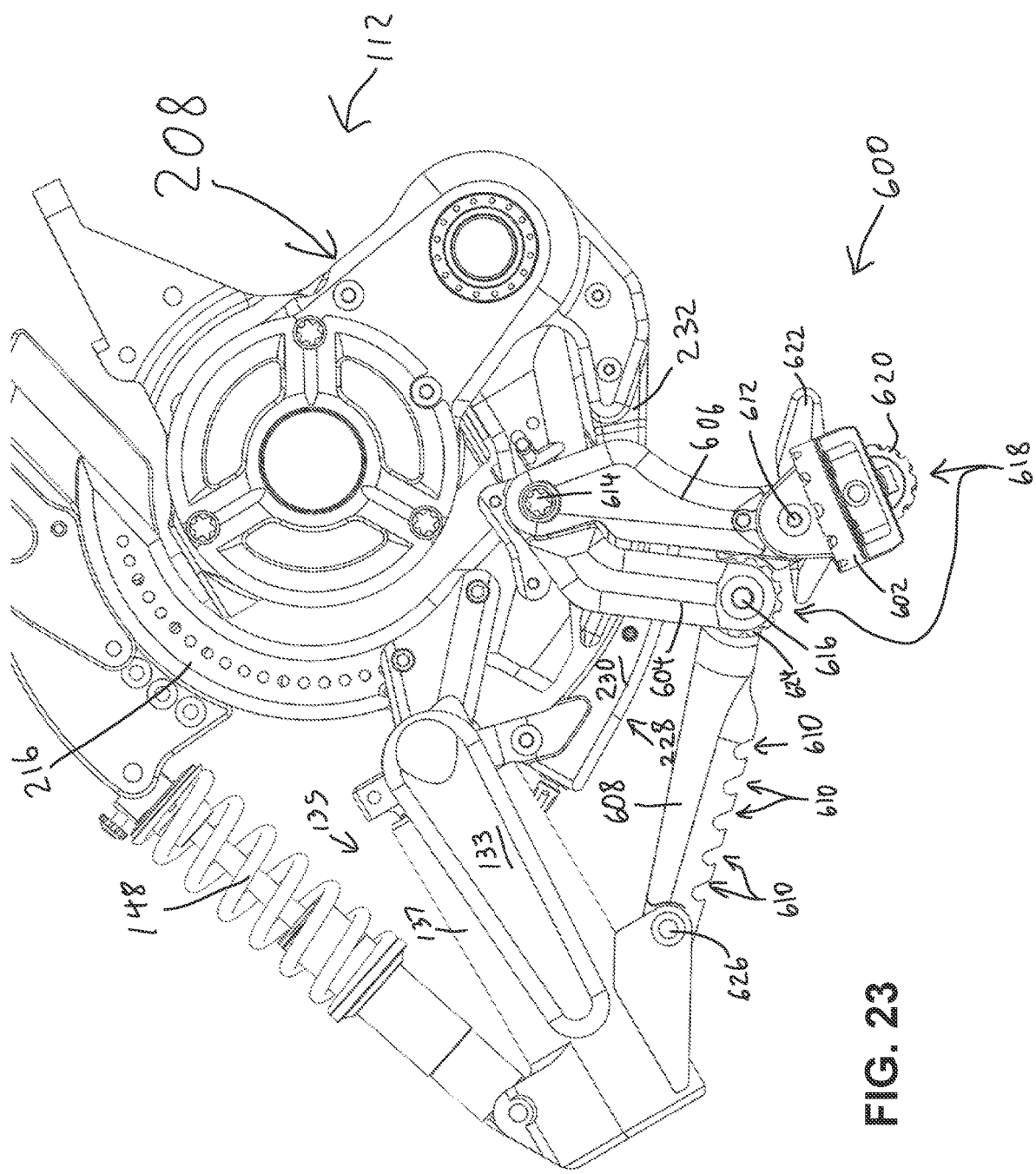
FIG. 23 is a left side view of the motorcycle and adjustable rider support system of FIG. 22.

Another exemplary embodiment of a rider support system 600 is illustrated in FIGS. 22 and 23. The rider support system 600 is configured similarly and functions in similar fashion to rider support systems 400 and 500 described above, and in particular system 600 includes a similar configuration of a drop/swing link 604 and a drop/push link 606 to that of links 504 and 506 of system 500. The rider support system 600 also includes foot platforms 602, a generally horizontal momentum/mass/force transfer link 608 which incorporates index valleys 610 that function in similar fashion to the index valleys 410a and 510a of rider support systems 400 and 500. The push link 606 and foot platform 602 are pivotably coupled to one another at a pivot point 612. The swing link 604 and push link 606 are each coupled to the hub 112 at pivot point 614. The swing link 604 and transfer link 608 are coupled to each other at pivot point 616. As noted, the rider support system 600 includes many identical or substantially similar components to systems 400 and 500, with significant differences discussed hereinafter. It will be appreciated that while not illustrated in the embodiment of FIGS. 22 and 23, a mass transfer function of similar to that of systems 400 and 500 as provided via the respective connecting rods 412 and 520 may be incorporated with rider support system 600 in order to transfer or shift a portion of the rider's mass toward the front wheel 118.

Unlike the push rod 518 configuration disclosed in regard to rider support system 500, the rider support system 600 transfers a rider's mass and/or forward momentum via a contact roller system 618 (FIGS. 22 and 23). The roller system 618 includes a set of push rollers 620 coupled between the left and right side push links 606 and foot platforms 602. A bumper 622 is disposed between the push links 606 and above the set of push rollers 620. A set of transfer rollers 624 that are coaxial with pivot point 616 are coupled between the left and right side swing links 604 and on each side of the transfer link 608. A portion of the bumper 622 is positioned adjacent to the transfer rollers 624 and is provided for pushing against the transfer rollers 624 to transfer mass and/or momentum from the foot platforms 602 to the transfer link 608. While mass/momentum transfer mechanisms of systems 500 and 600 are different, the bumper 622 functions in similar fashion as push rod 518 disclosed above in regard to rider support system 500.

The rollers 620 and 624 of the roller system 600 are freely rotatable and are provided for rolling over debris and obstacles, such as rocks or curbs, to reduce or eliminate damage to the vehicle 100. As such, the roller system 618 provides a durable guard or protective cage around the steering actuation linkage 228 to protect it from impacts with debris or obstacles below the vehicle 100. Another difference between rider support system 600 and rider support systems 400 and 500 is the configuration of the index ladder or index valleys 610. In the illustrated embodiment of FIGS. 22 and 23, the transfer link 608 includes the index valleys 610 and there by functions as an indexing ladder. An indexing point 626 is coupled to the steer tube housing 137 and is provided for indexing with the index valleys 610 of the transfer link 608. While the indexing mechanism of rider support system 600 is different than that of rider support system 400 and 500, the overall function of the index valleys 610 and the indexing point 626 is substantially similar to the function of the index ends 410a and 510a and the index ladders 410 and 510 of system 400 and 500.

Figure 24:
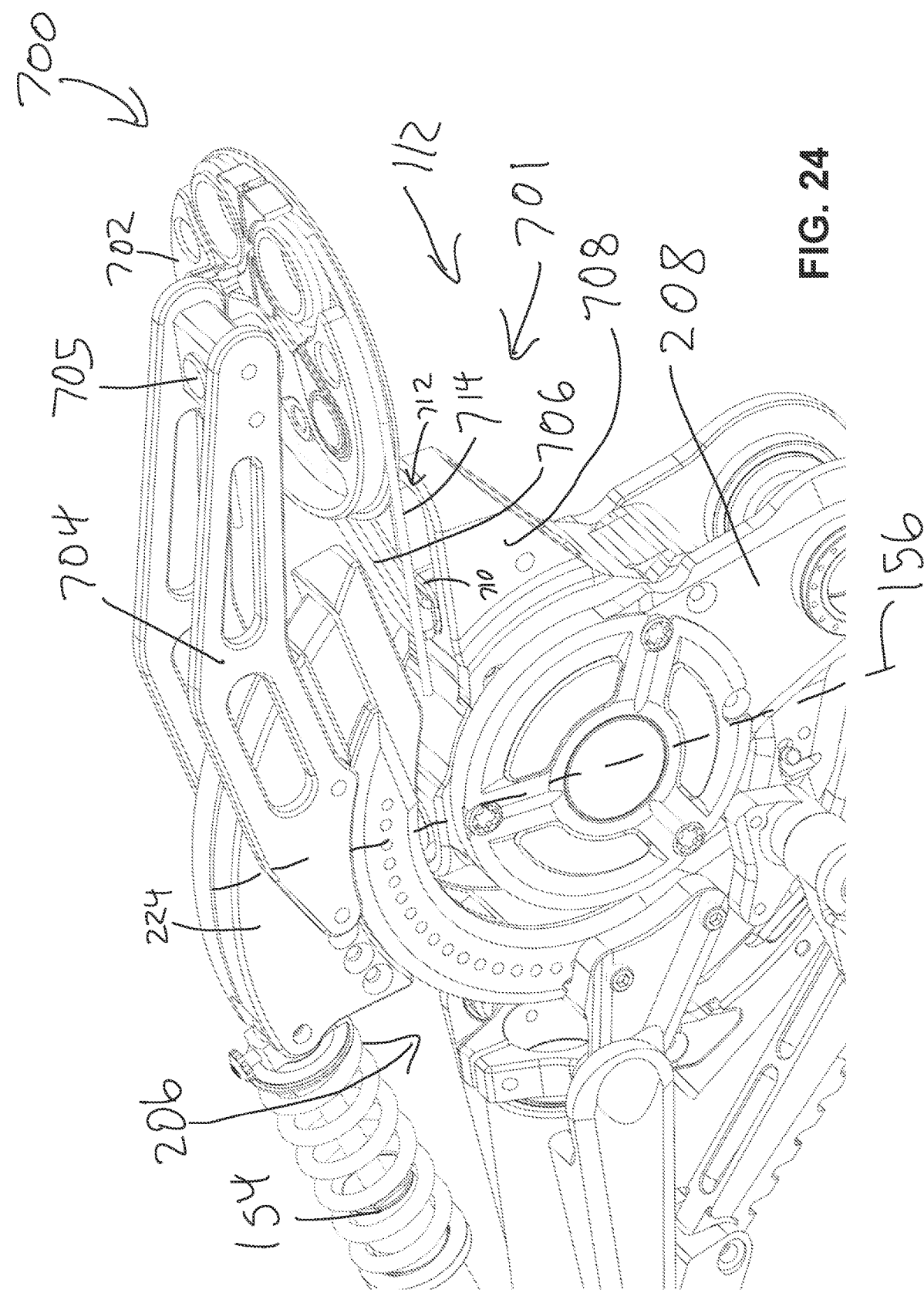
FIG. 24 is an enlarged rear-left side perspective view of a portion of a hub of another motorcycle and another cable steering system, in accordance with aspects of the present invention.
Figure 25:
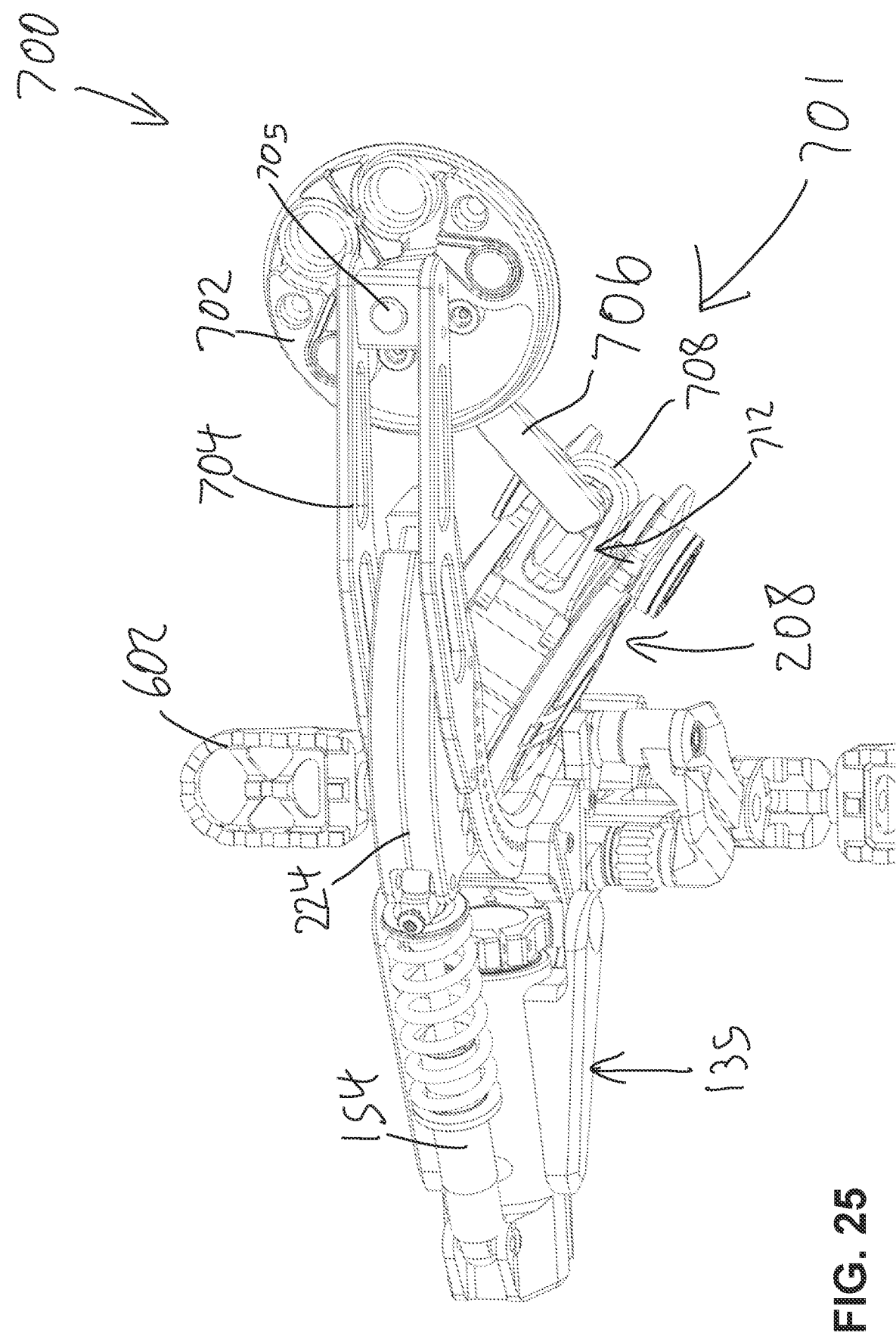
FIG. 25 is a top-left side perspective view of the motorcycle and cable steering system of FIG. 24.
Figure 26:
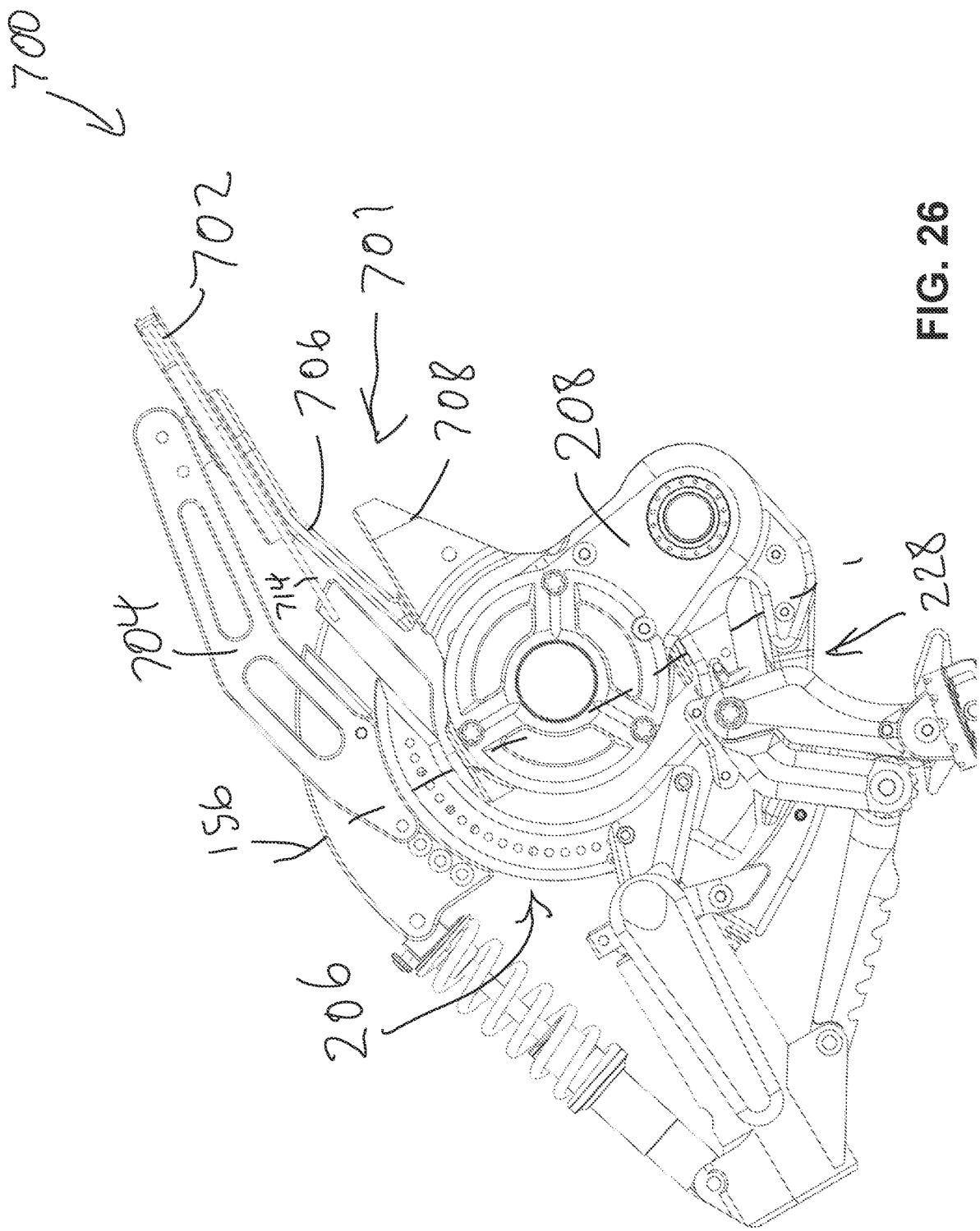
FIG. 26 is a left side view of the motorcycle and cable steering system of FIG. 24.

In the illustrated embodiments of FIGS. 1-6, the support platforms 402 remain in-line with the center line of the telescopic shock absorber 130 regardless of the configuration of the orbital steering assembly 204. In other words, the support platforms 402 pivot with the front orbital assembly 206 when the vehicle 100 pivots about the hub 112. However, this is not a requirement. Instead, as would be understood by one skilled in the art, embodiments are contemplated in which the rider support platforms 402 remain in-line with the center line of the rear orbital assembly 208 and the rear wheel 120 regardless of the configuration of the orbital steering assembly 204. Further embodiments are contemplated in which the foot support platforms 402 and/or rider support system 400 move or pivot independent of the orbital steering assembly 204. The support platforms 502 of rider support system 500 illustrated in FIGS. 20 and 21 pivot with the front orbital assembly 206 when the vehicle 100 pivots about the hub 112. The support platforms 602 of rider support system 600 illustrated in FIGS. 22-23 pivot with the front orbital assembly 206 when the vehicle 100 pivots about the hub 112. Referring now to the illustrative embodiment of FIGS. 24-26, another embodiment of a cable steering system 700 is provided for controlling the steerable wheel 118 about the second steering axis 156. The cable steering system 700 is coupled to a portion of the rear orbital assembly 208 as opposed to the front orbital assembly 206 as the cable steering system 300 of the embodiment of FIGS. 1-10. The cable steering system 700 includes an output pulley 702 that is rotatably coupled to a stanchion frame 704 at pivot point 705 (FIGS. 24-26). The stanchion frame 704 is coupled to and extends upwardly and rearwardly from the C-frame upper support 224. The output pulley 702 may be configured similarly or identical to pulley 328 illustrated in FIG. 15. The cable steering system 700 includes a steering actuation linkage 701 that functions in many similar or identical respects to that of steering actuation linkage 228 and disclosed above and illustrated in FIGS. 4-5 and 17-19. However, the components of the steering actuation linkage 701 are arranged in a different manner compared to linkage 228. The steering actuation linkage 701 includes an articulation shaft 706 that is fixedly coupled at one end to an underside of output pulley 702 and an articulation linkage frame 708 fixedly coupled to a rearward portion of the rear orbital assembly 208. The articulation shaft 706 and linkage frame 708 are rotatably coupled to one another via a slideable bracket or follower 710 that is slideably disposed in a guide track or raceway 712. The articulation shaft 706, linkage frame 708, slideable bracket 710, and raceway 712 function in many similar or identical ways to that of links 230, 232, and the slideable bracket 236, and raceway 238 of the steering actuation linkage 228 mentioned above. The steering actuation linkage 701 may be utilized along with the steering actuation linkage 228, as illustrated in FIG. 26.

The cable 714 routed through the output pulley 702 may be routed through a series of pulleys disposed along an articulated handlebar support linkage, such as similar to the pulleys 310 and articulated linkage 314 as described above and illustrated in FIGS. 1-10. As the handlebar moves the cable 714, the output pulley 702 is rotated about pivot point 705. The rotation of the output pulley 702 causes the articulation shaft 706 to rotate away from the center line of the vehicle 100, as shown in FIG. 25, thereby urging the linkage frame 708 to move, thus rotating the rear orbital assembly 208 relative to the front orbital assembly 206 about the second steering axis 156.

Broadly, this writing discloses at least the following. A vehicle includes a main vehicle body, a suspended assembly that supports the main body of the vehicle, a suspension system for connecting the suspended assembly to the main vehicle body, a position adjusting system for the vehicle, a multi-axis steering system for a vehicle, a cable steering system for controlling a multi-axis steering system of the vehicle, and a rider foot support system for the vehicle. The suspended assembly assists in providing directional control of the vehicle and stability in a lateral direction relative to a normal straight-ahead direction of travel of the vehicle. The suspension system including a first suspension system that movably connects the suspended assembly to the main vehicle body and controls movement of the suspended assembly relative to the main vehicle body through a range of motion along a first path that is primarily perpendicular to the lateral direction. The suspension system also including a second suspension system that controls movement of the suspended assembly relative to the main vehicle body through a range of motion along a second path that is primarily perpendicular to the lateral direction when the vehicle is traveling in the normal straight-ahead direction. The second path of the second suspension system being different than the first path of the first suspension system such that the combination of the range of motion of the first suspension system along the first path and the range of motion of the second suspension system along the second path result in an overall range of motion for the suspended assembly relative to the main body that is defined by a surface area.

This writing further discloses the following. A vehicle includes a suspended assembly that supports a main body and a suspension system for connecting the suspended assembly to the main vehicle body. The suspended assembly assists in providing directional control of the vehicle and stability in a lateral direction relative to a normal straight-ahead direction of travel of the vehicle. The suspension system including first and second suspension systems that control movement of the suspended assembly relative to the main vehicle body through a range of motion along first and second paths that are primarily perpendicular to the lateral direction. The second path differs from the first path such that the combination of the range of motion of the first suspension system along the first path and the second path result in an overall range of motion for the suspended assembly relative to the main body that is defined by a surface area.

All elements, parts and steps described herein are preferably included. It is to be understood that any of these elements, parts and steps may be replaced by other elements, parts and steps or deleted altogether as will be obvious to those skilled in the art.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A cable steering system for use in a wheeled vehicle having a main vehicle body and a steerable wheel that supports the main vehicle body, the steerable wheel having a wheel axis around which the steerable wheel rotates in a wheel rotation plane that is perpendicular to the wheel axis, the steerable wheel assisting in providing directional control of the vehicle and stability in a lateral direction relative to a normal straight-ahead direction of travel for the vehicle, said cable steering system comprising:
 a steering control system that controls movement of the steerable wheel relative to the main vehicle body such that the steerable wheel pivots about a steering axis, said steering control system comprising:
  a handlebar coupled with the main vehicle body for allowing a rider to control the steerable wheel;
  a steering tube assembly coupled at a first end to the steerable wheel and at a second end to the main vehicle body, wherein the longitudinal axis of said steering tube assembly defines the steering axis, said steering tube assembly having a rotatable portion that is rotatable relative to said main vehicle body about said steering axis;
  a handlebar support for connecting said handlebar to the main vehicle body, wherein said handlebar is moveable relative to said handlebar support about a handlebar axis that is different than the steering axis;
  a plurality of pulleys disposed in spaced arrangement on at least one of said handlebar support and the main vehicle body between said handlebar and said steering tube assembly; and
  a cable coupled between said handlebar and the rotatable portion of said steering tube assembly and routed through said plurality of pulleys such that as the handlebar moves about the handlebar axis said rotatable portion of said steering tube assembly rotates relative to the main vehicle body about the steering axis and thereby the steerable wheel rotates relative to the main vehicle body about the steering axis.

2. The cable steering system of claim 1, wherein the main vehicle body of the wheeled vehicle comprises a hub having a first hub portion and a second hub portion that are moveable relative to one another about a hub axis, wherein said steering tube assembly is coupled to said first hub portion such that the steerable wheel is pivotable relative to said second hub portion about the hub axis.

3. The cable steering system of claim 2, further comprising a hub axis actuation linkage assembly disposed between said steering tube assembly and said second hub portion, wherein said actuation linkage assembly automatically moves said first and second hub portions relative to one another about said hub axis when said rotatable portion of said steering tube assembly and the steerable wheel rotate relative to the main vehicle body about the steering axis.

4. The cable steering system of claim 1, wherein said handlebar support comprises an articulated linkage and a plurality of pulleys disposed along said articulated linkage, said pulleys of said handlebar support are configured to receive and guide said cable between said handlebar and at least one chosen from said main vehicle body and said steering tube assembly.

5. The cable steering system of claim 4, wherein said articulated linkage comprises a first link, a second link pivotably coupled with said first link, and a biasing and dampening arrangement disposed between said first and second links.

6. The cable steering system of claim 4, further comprising a cable tensioning assembly comprising a biasing device to automatically urge at least one of said plurality of pulleys toward said cable to increase or relieve tension in said cable as said articulated linkage actuates.

7. A position adjusting system for use in a wheeled vehicle having a main vehicle body, a seat for supporting a rider, a plurality of wheels with at least one of the wheels being a steerable wheel, and a handlebar for allowing the rider to control the steerable wheel, the steerable wheel being steerable about a first steering axis and a second steering axis wherein at least one of the first and second steering axes extends through the main vehicle body, said position adjusting system comprising:
 a hub defining a portion of the main vehicle body, said hub interconnecting the plurality of wheels, the seat, and the handlebar of the wheeled vehicle, said hub having a first hub portion and a second hub portion that are movable relative to one another about the second steering axis;
 a seat support for connecting the seat to said hub;
 a handlebar support for connecting the handlebar to said hub;
 a first axis steering assembly configured to control movement of the steerable wheel relative to the main vehicle body about the first steering axis; and
 a second axis steering assembly configured to control movement of the steerable wheel relative to the main vehicle body about the second steering axis.

8. The position adjusting system of claim 7, wherein said first and second hub portions are moveably coupled together at a hub axle that defines the second steering axis.

9. The position adjusting system of claim 8, wherein said first hub portion comprises an arcuate outer frame and an arcuate inner frame which are rotatably moveable relative to one another about a hub pivot actuation axis which is perpendicular to the first steering axis.

10. The position adjusting system of claim 9, wherein said arcuate outer frame comprises an arcuate channel on the interior arc of said arcuate outer frame and said arcuate inner frame is configured to slideably nest within said arcuate channel.

11. The position adjusting system of claim 9, wherein said arcuate inner frame of said first hub portion and a main body of said second hub portion are each coupled to said hub axle such that said arcuate inner frame and said second hub portion are rotatable relative to one another about said second steering axis.

12. The position adjusting system of claim 11, further comprising a second steering axis actuator configured to automatically pivot said first and second hub portions relative to one another when said steerable wheel is turned about said first steering axis.

13. The position adjusting system of claim 7, further comprising:
- a front suspended assembly for connecting a front one of said plurality of wheels to said hub;
- a rear suspended assembly for connecting a rear one of said plurality of wheels to said hub; and
- a rider support system comprising a rider support platform at each side of the vehicle proximate said hub and a linkage assembly coupled between said rider support platforms and said hub, said linkage assembly comprising a force transfer link configured to transfer force from momentum of the rider to at least one chosen from said front suspended assembly, said rear suspended assembly, and said hub.

14. A wheeled vehicle comprising:
a main vehicle body;
a seat for supporting a rider;
a plurality of wheels with at least one of said wheels being a steerable wheel that is steerable about a first steering axis and a second steering axis that is different than the first steering axis;
a handlebar for allowing the rider to control said steerable wheel; and
a position adjusting assembly comprising:
- a hub defining a portion of said main vehicle body, said hub comprising:
  - a first orbital portion;
  - a second orbital portion pivotally coupled with said first orbital portion such that said orbital portions are movable relative to one another about one chosen from said first steering axis and said second steering axis; and
  - a pivot actuator defining a portion of one of said first orbital portion or said second orbital portion, said pivot actuator selectively operable to adjust an angle between said first steering axis and said second steering axis about a pivot actuation axis that is perpendicular to said steering axes relative to a normal straight-ahead direction of travel of said vehicle;
- a front suspended assembly for connecting a front one of said wheels to said first orbital portion of said hub;
- a rear suspended assembly for connecting a rear one of said wheels to said second orbital portion of said hub;
- a seat support for connecting said seat to said hub; and
- a handlebar support for connecting said handlebar to said hub.

15. The wheeled vehicle of claim 14, further comprising a steering tube assembly coupled at a first end to said steerable wheel and at a second end to said main vehicle body, wherein a longitudinal axis of said steering tube assembly defines said first steering axis, said steering tube assembly having a rotatable portion that is rotatable relative to said main vehicle body about said first steering axis.

16. The wheeled vehicle of claim 15, further comprising a second steering axis actuation linkage assembly comprising a forward link coupled to the rotatable portion of said steering tube assembly and a rearward link coupled to said second orbital portion, wherein said forward link and said rearward link are pivotally coupled to one another at their respective distal ends such that as the rotatable portion of said steering tube assembly rotates about said first steering axis the distal end of said forward link urges the distal end of said rearward link to move, thereby urging said second orbital portion to rotate relative to said first orbital portion about said second steering axis.

17. The wheeled vehicle of claim 15, further comprising a rider support system comprising a rider support platform at each side of said vehicle proximate said hub and a linkage assembly coupled between said rider support platforms and said hub, said linkage assembly comprising a force transfer link configured to transfer force from the momentum of the rider to at least one chosen from said front suspended assembly, said steering tube assembly, said first orbital portion of said hub, and said second orbital portion of said hub.

18. The wheeled vehicle of claim 15, further comprising:
- a handlebar support for connecting said handlebar to said main vehicle body, wherein said handlebar is moveable relative to said handlebar support about a handlebar axis that is different than said first and second steering axes;
- a plurality of pulleys disposed in spaced arrangement on at least one of said handlebar support and said main vehicle body between said handlebar and said steering tube assembly; and
- a cable coupled between said handlebar and the rotatable portion of said steering tube assembly and routed through said plurality of pulleys such that as said handlebar moves about said handlebar axis said rotatable portion of said steering tube assembly rotates relative to the main vehicle body about said first steering axis and thereby said steerable wheel rotates relative to said main vehicle body about said first steering axis.

19. The wheeled vehicle of claim 18, wherein said handlebar support comprises an articulated linkage and a plurality of pulleys disposed along said articulated linkage, said pulleys of said handlebar support are configured to receive and guide said cable between said handlebar and at least one chosen from said main vehicle body and said steering tube assembly.

20. The wheeled vehicle of claim 19, further comprising a cable tensioning assembly comprising a biasing device to automatically urge at least one of said plurality of pulleys toward said cable to increase or relieve tension in said cable as said articulated linkage actuates.

* * * * *

UNITED STATES PATENT AND TRADEMARK OFFICE
CERTIFICATE OF CORRECTION

| | |
|---|---|
| PATENT NO. | : 12,227,260 B1 |
| APPLICATION NO. | : 17/841099 |
| DATED | : February 18, 2025 |
| INVENTOR(S) | : Jeffrey Michael |

It is certified that error appears in the above-identified patent and that said Letters Patent is hereby corrected as shown below:

In the Specification

Column 17
Line 24 "and 310c" should be --and 310e--

Column 18
Line 36 "and 310c" should be --and 310e--

Column 20
Line 38 "368a. 368b" should be --368a, 368b--

Column 24
Line 64 "toc stop" should be --toe stop--

Signed and Sealed this
Twenty-fourth Day of June, 2025

Coke Morgan Stewart
*Acting Director of the United States Patent and Trademark Office*